United States Patent
Wang et al.

(10) Patent No.: US 8,868,887 B2
(45) Date of Patent: Oct. 21, 2014

(54) PROGRAMMABLE EVENT DRIVEN YIELD MECHANISM WHICH MAY ACTIVATE OTHER THREADS

(75) Inventors: Hong Wang, Santa Clara, CA (US); Per Hammarlund, Hillsboro, OR (US); Xiang Zou, Beaverton, OR (US); John Shen, San Jose, CA (US); Xinmin Tian, Union City, CA (US); Milind Girkar, Sunnyvale, CA (US); Perry Wang, San Jose, CA (US); Piyush Desai, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 616 days.

(21) Appl. No.: 10/982,261

(22) Filed: Nov. 5, 2004

(65) Prior Publication Data
US 2005/0166039 A1 Jul. 28, 2005

Related U.S. Application Data

(62) Division of application No. 10/370,251, filed on Feb. 19, 2003, now Pat. No. 7,487,502.

(51) Int. Cl.
*G06F 9/00* (2006.01)
(52) U.S. Cl.
USPC ........................................................ 712/228
(58) Field of Classification Search
USPC ................................ 712/224, 228, 1, 244, 245
See application file for complete search history.

(56) References Cited

U.S. PATENT DOCUMENTS

| | | | |
|---|---|---|---|
| 4,006,466 A | 2/1977 | Patterson et al. | |
| 4,594,660 A | 6/1986 | Guenthner et al. | |
| 4,807,231 A | 2/1989 | Sato | |
| 5,526,283 A | 6/1996 | Hershey et al. | |
| 5,761,492 A | 6/1998 | Fernando et al. | |
| 5,815,727 A * | 9/1998 | Motomura | 712/1 |
| 5,838,988 A | 11/1998 | Panwar et al. | |
| 5,933,627 A * | 8/1999 | Parady | 712/228 |

(Continued)

FOREIGN PATENT DOCUMENTS

| | | | | |
|---|---|---|---|---|
| EP | 0 652 518 A1 | 5/1995 | | |
| EP | 0909094 A1 * | 4/1999 | ............. | H04N 7/173 |

OTHER PUBLICATIONS

Chappell, R.S. Tseng, F. Yoaz, A. Patt, Y.N.; Microarchitectural support for precomputation microthreads, 2002, Proceedings of 35th Annual IEEE/ACM International Symposium on Microarchitecture, 2002 (MICRO-35).; pp. 74-84.*

(Continued)

*Primary Examiner* — Jacob A Petranek
(74) *Attorney, Agent, or Firm* — Blakely, Sokoloff, Taylor & Zafman LLP

(57) ABSTRACT

Method, apparatus, and program means for a programmable event driven yield mechanism that may activate other threads. In one embodiment, an apparatus includes execution resources to execute a plurality of instructions and a monitor to detect a condition indicating a low level of progress. The monitor can disrupt processing of a program by transferring to a handler in response to detecting the condition indicating a low level of progress. In another embodiment, thread switch logic may be coupled to a plurality of event monitors which monitor events within the multithreading execution logic. The thread switch logic switches threads based at least partially on a programmable condition of one or more of the performance monitors.

27 Claims, 12 Drawing Sheets

(56) References Cited

U.S. PATENT DOCUMENTS

| | | | |
|---|---|---|---|
| 5,978,857 A | 11/1999 | Graham | |
| 6,061,710 A * | 5/2000 | Eickemeyer et al. | 718/107 |
| 6,076,157 A * | 6/2000 | Borkenhagen et al. | 712/228 |
| 6,167,448 A | 12/2000 | Hemphill et al. | |
| 6,212,544 B1 * | 4/2001 | Borkenhagen et al. | 718/103 |
| 6,493,741 B1 | 12/2002 | Emer et al. | |
| 6,779,065 B2 | 8/2004 | Murty et al. | |
| 6,865,636 B1 | 3/2005 | Hober et al. | |
| 6,928,645 B2 * | 8/2005 | Wang et al. | 718/102 |
| 6,938,147 B1 * | 8/2005 | Joy et al. | 712/28 |
| 7,020,766 B1 | 3/2006 | Wang et al. | |
| 7,165,254 B2 | 1/2007 | Yoshida | |
| 7,343,602 B2 * | 3/2008 | Luk et al. | 718/100 |
| 7,360,220 B2 * | 4/2008 | Ramanujam et al. | 718/107 |
| 7,363,625 B2 * | 4/2008 | Burky et al. | 718/103 |
| 7,430,643 B2 * | 9/2008 | Jordan et al. | 711/150 |
| 2002/0038416 A1 * | 3/2002 | Fotland et al. | 712/228 |
| 2002/0059425 A1 | 5/2002 | Belfiore et al. | |
| 2002/0124237 A1 | 9/2002 | Sprunt et al. | |
| 2002/0138717 A1 * | 9/2002 | Joy et al. | 712/235 |
| 2003/0005423 A1 | 1/2003 | Chen et al. | |
| 2003/0145314 A1 | 7/2003 | Nguyen et al. | |
| 2004/0123185 A1 | 6/2004 | Pierce et al. | |

OTHER PUBLICATIONS

Dubois, Michel, Song, Yong H. "Assisted Execution" CENG Technical Report 98-25, Oct. 1998. pp. 1-25.*
S. G. Abraham and B. R. Rau. Predicting load latencies using cache profiling. In *Hewlett Lab, Technical ReportHPL-94-110*, Dec. 1994.
M. Carlisle. Olden: Parallelizing programs with dynamic data structures on distributed-memory machines. In *PhD Thesis, Princeton University Department of Computer Science*, Jun. 1996.
J. Emer. Simultaneous multithreading: Multiplying alpha's performance. In *Microprocessor Forum*, Oct. 1999.
D. Joseph and D. Grunwald. Prefetching using markov predictors. In *24th Annual International Symposium on Computer Architecture*, Jun. 1997.
A. Roth, A. Moshovos, and G. Sohi. Dependence based prefetching for linked data structures. In *Eighth International Conference on Architectural Support for Programming Languages and Operating Systems*, Oct. 1998.
A. Roth and G. Sohi. Speculative data-driven multithreading. In *Seventh International Symposium on High Performance Computer Architecture*, pp. 37-48, Jan. 2001. *And Operating Systems*, pp. 257-268, Nov. 2000.
Y. Song and M. Dubois. Assisted execution. In *Technical Report CENG 98-25, Department of EE-Systems, University of Southern California*, Oct. 1998.
K. Sundaramoorthy, Z. Purser, and E. Rotenberg. Slipstream processors: Improving both performance and fault tolerance. In *Ninth International Conference on Architectural Support for Programming Languages*.
D. Tullsen. Simulation and modeling of a simultaneous multithreaded processor. In *22nd Annual Computer Measurement Group Conference*, Dec. 1996.
D. Tullsen, S. Eggers, J. Emer, H. Levy, J. Lo, and R. Stamm. Exploiting choice: Instruction fetch and issue on an implementable simultaneous multithreading processor. In *23rd Annual International Symposium on Computer Architecture*, pp. 191-202, May 1996.
R. Uhlig, R. Fishtein, O. Gershon, I. Hirsh, and H. Wang. Softsdv: A presilicon software development environment for the ia-64 architecture. In *Intel Technology Journal*, 4th quarter1999.
C. Young, N. Gloy, and M. D. Smith. A comparative analysis of schemes for correlated branch prediction. In *22nd Annual International Symposium on Computer Architecture*, pp. 276-286, May 1995.
C. Zilles and G. Sohi. Understanding the backward slices of performance degrading instructions. In *27th Annual International Symposium on Computer Architecture*, pp. 172-181, Jun. 2000.
J. Collins, H. Wang, D. Tullsen, H. C, Y.-F. Lee, D. Lavery, and J. Shen. Speculative Precomputation: Long-range Prefetching of Delinquent Loads. In *28th International Symposium on Computer Architecture*, Jul. 2001.
J. Dundas and T. Mudge. Improving Data Cache Performance by Pre-Executing Instructions Under a Cache Miss. In *11th Supercomputing Conference*, Jul. 1997.
M. K. Farrens, P. Ng, and P. Nico. A Comparison of Superscalar and Decoupled Access/Execute Architectures. In *26th International Symposium on Microarchitecture*, Nov. 1993.
J. L. Henning. SPEC CPU2000: measuring CPU performance in the new millennium. *IEEE Computer*, Jul. 2000.
G. Hinton, D. Sager, M. Upton, D. Boggs, D. Carmean, A. Kyker, and P. Roussel. The Microarchitecture of the Pentium 4 Processor. *Intel Technology Journal*, Q1 2001.
K. Olukotun, B. Nayfeh, L. Hammond, K. Wilson, and K. Chang. The Case for a Single-Chip Multiprocessor. In *7th International Conference on Architectural Support for Programming Languages and Operating Systems*, Oct. 1996.
S. Palacharla, N. Jouppi, and J. Smith. Complexity-Effective Superscalar Processors. In *24th International Symposium on Computer Architecture*, 1997.
A. Roth, C. B. Zilles, and G. S. Sohi. Microarchitectural Miss/Execute Decoupling. In *MEDEA Workshop*, Oct. 2000.
H. Sharangpani and K. Aurora. Itanium Processor Microarchitecture. *IEEE Micro*, Sep.-Oct. 2000.
J. E. Smith. Decoupled Access/Execute Computer Architecture. In *9th International Symposium on Computer Architecture*, Jul. 1982.
S. Srinivasan and A. Lebeck. Load Latency Tolerance in Dynamically Scheduled Processors. In *31st International Symposium on Microarchitecture*, Nov. 1998.
P.Wang, H. Wang, R. Kling, K. Ramakrishnan, and J. Shen. Register Renaming and Scheduling for Dynamic Execution of Predicated Code. In *7th IEEE International Symposium on High Performance Computer Architecture*, Jan. 2001.
D. Marr, et al., "Hyper-Threading Technology Architecture and Microarchitecture," *Intel Technology Journal*, Q1, 2002.
T. Aamodt, A. Moshovos, and P. Chow. The Predictability of Computations that Produce Unpredictable Outcomes. In *5th Workshop on Multithreaded Execution, Architecture and Compilation*, pp. 23-34, Austin, Texas, Dec. 2001.
M. Annavaram, J. Patel, E. Davidson. Data Prefetching by Dependence Graph Precomputation. In *28th International Symposium on Computer Architecture*, Jul. 2001.
K. Cooper, P. Schielke, D. Subramanian. An experimental evaluation of list scheduling. Rice University Technical Report 98-326, Sep. 1998.
G. Hinton and J. Shen. Intel's multi-threading technology. *Microprocessor Forum*, Oct. 2001.
R. Krishnaiyer, D. Kulkarni, D. Lavery, W. Li, C. Lim, J. Ng, D. Sehr. An Advanced Optimizer for the IA-64 Architecture, *IEEE Micro*, Nov.-Dec. 2000.
S. Liao. SUIF Explorer. PhD thesis, Stanford University, Aug. 2000, Stanford Technical Report CSL-TR-00-807.
C. K. Luk, Tolerating Memory Latency through Software-Controlled Pre-Execution in Simultaneous Multithreading Processors, In *28th International Symposium on Computer Architecture*, Jun. 2001.
D. Marr, F. Binns, D. Hill, G. Hinton, D. Koufaty, J. Miller, M. Upton. Hyper-threading technology architecture and microarchitecture. *Intel Technology Journal*, vol. 6, Issue on Hyper-threading, Feb. 2002.
A. Moshovos, D. Pnevmatikatos, A. Baniasadi. Slice procesors: an implementation of operation-based prediction. In International Conference on Supercomputing, Jun. 2001.
H. Wang, P. Wang, R. D. Weldon, S. Ettinger, H. Saito, M. Girkar, S. Liao, J. Shen. Speculative precomputation: exploring use of multithreading technology for latency. In *Intel Technology Journal*, vol. 6, Issue on Hyperthreading, Feb. 2002.
P. Wang, H. Wang, J. Collins, E. Grochowski, R. Kling, J. Shen. Memory latency-tolerance approaches for Itanium processors: out-of-order execution vs. speculative precomputation. In *Proceedings of the 8th IEEE High- Performance Computer Architecture*, Cambridge, Massachusetts, Feb. 2002.

(56) References Cited

OTHER PUBLICATIONS

M. Weiser. Program slicing. In *IEEE Transactions on Software Engineering*, 10(4), pp. 352-357, 1984.

C. Zilles and G. Sohi. Understanding the backward slices of performance degrading instructions. In *27th International Symposium on Computer Architecture*, Vancouver, BC, Canada, May 2000.

C. Zilles and G. Sohi. Execution-based prediction using speculative slices. In *28th International Symposium on Computer Architecture*, Goteborg, Sweden, Jul. 2001.

T. Aamodt, P. Marcuello, P. Chow, P. Hammarlund, H. Wang, and J. Shen. Hardware Support for Prescient Instruction Prefetch. In 10th International Symposium on High Performance Computer Architecture, Feb. 2004.

A. Agarwal, B. Lim, D. Kranz, and J. Kubiatowicz. April: A Processor Architecture for Multiprocessing. In 17th Inter- national Symposium on Computer Architecture, Jun. 1990.

J. M. Borkenhagen, R. J. Eickemeyer, R. N. Kalla, and S. Kunkel. A Multithreaded PowerPC Processor for Commercial Servers. IBM Journal of Research and Development, 44(6):885-898, 2000.

R. S. Chappell, S. P. Kim, S. K. Reinhardt, and Y. N. Patt. Simultaneous Subordinate Microthreading (SSMT). In $26^{th}$ International Symposium on Computer Architecture, pp. 186-195, Atlanta, GA, May 1999. ACM.

R. S. Chappell, F. Tseng, A. Yoaz, and Y. N. Patt. Di_cult- path Branch Prediction Using Subordinate Microthreads. In 29th International Symposium on Computer Architecture, Anchorage, AK, May 2002.

J. Collins, D. Tullsen, H. Wang, and J. Shen. Dynamic Spec- ulative Precomputation. In Proceedings of the 34th Annual ACM/IEEE International Symposium on Microarchitecture, pp. 306-317, Austin, TX, Dec. 2001. ACM.

R. Eickemeyer, R. Johnson, S. Kunkel, B.-H. Lim, M. Squil- lante, and C. Wu. Evaluation of Multithreaded Processors and Thread Switch Policies. In International Symposium on High Performance Computing, pp. 75-90, Fukuoka, Japan, Nov. 1997.

M. K. Farrens and A. R. Pleszkun. Strategies for Achieving Improved Processor Throughput. In 18th International Symposium on Computer Architecture, May 1991.

J. W. Haskins Jr., K. R. Hirst, and K. Skadron. Inexpensive Throughput Enhancement in Small-Scale Embedded Microprocessors with Block Multithreading: Extensions, Characterization, and Tradeo_s. In 20th International Performance, Computing, and Communications Conference, Apr. 2001.

D. Kim, S. Liao, P. Wang, J. del Cuvillo, X. Tian, X. Zou, H. Wang, D. Yeung, M. Girkar, and J. Shen. Physical Experimentation with Prefetching Helper Threads on Intel's Hyper-Threaded Processors. In International Symposium on Code Generation and Optimization, Mar. 2004.

S. Liao, P. Wang, H. Wang, G. Hoflehner, D. Lavery, and J. Shen. Post-Pass Binary Adaptation for Software-Based Speculative Precomputation. In ACM Conference on Programming Language Design and Implementation, Jun. 2002.

T. C. Mowry, C. Q. Chan, and A. K. Lo. Comparative Evaluation of Latency Tolerance Techniques for Software Distributed Shared Memory. In 4th International Symposium on High Performance Computer Architecture, Feb. 1998.

T. C. Mowry, M. S. Lam, and A. Gupta. Design and Evaluation of a Compiler Algorithm for Prefetching. In 5th International Conference on Architectural Support for Programming Languages and Operating Systems, Oct. 1992.

O. Mutlu, J. Stark, C. Wilkerson, and Y. Patt. Runahead Execution: An Alternative to Very Large Instruction Windows for Out-of-order Processors. In 9th International Symposium on High Performance Computer Architecture, Jan. 2003.

V. Panait, A. Sasturkar, and W.-F. Wong. Static Identification of Delinquent Loads. In International Symposium on Code Generation and Optimization, Mar. 2004.

J. Redstone, S. Eggers, and H. Levy. Mini-threads: Increasing TLP on Small-Scale SMT Processors. In 9th International Symposium on High Performance Computer Architecture, Feb. 2003.

D. M. Tullsen, J. L. Lo, S. J. Eggers, and H. M. Levy. Supporting Fine-Grained Synchronization on a Simultaneous Multithreading Processor. In 5th International Symposium on High Performance Computer Architecture, Jan. 1999.

C. A. Waldspurger and W. E. Weihl. Register Relocation: Flexible Contexts for Multithreading. In 20th International Symposium on Computer Architecture, May 1993.

Zilles, Craig; Sohi, Guri, "Timed-Shifted Modules: Exploiting Code Modularity for Fine Grain Parallelization", University of Wisconsin Technical Report—TR1430, Oct. 2001 (bibtex).

Lewandowski, Scott M., "Intel X86 Assembly and Debugging Support", CS295-2; Advanced Topics in Debugging; Sep. 21, 1998, 47 pages.

Kessler, R.E., "The Alpha 21264 Microprocessor", IEEE Micro, Mar./Apr. 1999, pp. 24-36.

El-Moursey, Ali; and Albonesi, David H., "Front-End Policies for Improved Issue Efficiency in SMT Processors", $9^{th}$ Int'l Symposium on High Performance Computer Architecture, Feb. 2003, 10 pages.

Sundaramoorthy, et al., "Slipstream Processors: Improving both Performance and Fault Tolerance", In Ninth International Conference on Architectural Support for Programming Languages, Nov. 2000.

Search Report from foreign counterpart Netherlands Patent Application No. 1024839, mailed May 21, 2007, 3 pages.

Martonosi—Integrating Performance Monitoring and Communication in Parallel Computers, 1996 ACM Sigmetrics International Conference on Measurement and Modeling of Computer Systems, May 23-25, 1996, 10 pages.

Martonosi—Tunning Memory Performance of Sequential and Parallel Programs, computer, IEEE Service Center, Apr. 1, 1995, 9 pages.

S. G. Abraham and B. R. Rau. Predicting load latencies using cache profiling. In *Hewlett Packard Lab, Technical Report HPL-94-110*, pp. 1-40, Dec. 1994.

M. Carlisle. Olden: Parallelizing programs with dynamic data structures on distributed-memory machines. In *PhD Thesis, Princeton University Department of Computer Science*, 130 pages, Jun. 1996.

R. Chappell, J. Stark, S. Kim, S. Reinhardt, and Y. Patt. Simultaneous subordinate microthreading (ssmt). In *26th Annual International Symposium on Computer Architecture*, pp. 186-195, Oct. 1999.

J. Emer. Simultaneous multithreading: Multiplying alpha's performance. In *Microprocessor Forum*, 23 pages, Oct. 1999.

J. B. et al. The intel ia-64 compiler code generator. In *IEEE Micro*, pp. 44-53, Sep.-Oct. 2000.

R. K. et al. An advanced optimizer for the ia-64 architecture. In *IEEE Micr*, pp. 60-68, Nov.-Dec. 2000.

J. Huck, D. Morris, J. Ross, A. Knies, H. Mulder, and R. Zahir. Introducing the ia-64 architecture. In *IEEE Micro*, pp. 12-23, Sep.-Oct. 2000.

D. Joseph and D. Grunwald. Prefetching using markov predictors. In *24th Annual International Symposium on Computer Architecture*, pp. 252-263, Jun. 1997.

Y. Kim, M. Hill, and D. Wood. Implementing stack simulation for highly-associative memories (extended abstract). In *ACM Sigmetrics*, pp. 212-213, May 1991.

A. Roth, A. Moshovos, and G. Sohi. Dependence based prefetching for linked data structures. In *Eighth International Conference on Architectural Support for Programming Languages and Operating Systems*, pp. 115-126, Oct. 1998.

A. Roth and G. Sohi. Speculative data-driven multithreading. In *Seventh International Symposium on High Performance Computer Architecture*, pp. 1-12, Jan. 22-24, 2001.

H. Sharangpani and K. Aurora. Itanium processor microarchitecture. In *IEEE Micro*, pp. 24-43, Sep.-Oct. 2000.

Y. Song and M. Dubois. Assisted execution. In *Technical Report CENG 98-25, Department of EE-Systems, University of Southern California*, pp. 3-25, Oct. 1998.

K. Sundaramoorthy, Z. Purser, and E. Rotenberg. Slipstream processors: Improving both performance and fault tolerance. In *Ninth International Conference on Architectural Support for Programming Languages and Operating Systems*, pp. 257-268, Nov. 2000.

Tullsen, Simulation and modeling of a simultaneous multithreaded processor. In *22nd Annual Computer Measurement Group Conference*, pp. 819-828, Dec. 1996.

(56) References Cited

OTHER PUBLICATIONS

D. Tullsen, S. Eggers, J. Emer, H. Levy, J. Lo, and R. Stamm. Exploiting choice: Instruction fetch and issue on an implementable simultaneous multithreading processor. In *23rd Annual International Symposium on Computer Architecture*, pp. 191-202, May 1996.
D. M. Tullsen, S. J. Eggers, and H. M. Levy. Simultaneous multithreading: Maximizing on-chip parallelism. In *22nd Annual International Symposium on Computer Architecture*, pp. 392-403, Jun. 1995.
S. Wallace, B. Calder, and D. M. Tullsen. Threaded multiple path execution. In *25th Annual International Symposium on Computer Architecture*, pp. 238-249, Jun. 1998.
C. Young, N. Gloy, and M. D. Smith. A comparative analysis of schemes for correlated branch predicition. In *22nd Annual International Symposium on Computer Architecture*, pp. 276-286, May 1995.
C. Zilles and G. Sohi. Understanding the backward slices of performance degrading instructions. In *27th Annual International Symposium on Computer Architectures*, pp. 172-181, Jun. 2000.
J. Collins, H. Wang, D. Tullsen, H. C, Y.-F. Lee, D. Lavery, and J. Shen. Speculative Precomputation: Long-range Prefetching of Delinquent Loads. In 28th International Symposium on Computer Architecture, pp. 14-25, Jul. 2001.
J. Dundas and T. Mudge. Improving Data Cache Performance by Pre-Executing Instructions Under a Cache Miss. In *11th Supercomputing Conference*, pp. 68-75, Jul. 1997.
M. K. Farrens, P. Ng, and P. Nico. A Comparison of Superscalar and Decoupled Access/Execute Architectures. In *26th International Symposium on Microarchitecture*, pp. 100-103, Nov. 1993.
J. L. Henning. SPEC CPU2000: measuring CPU performance in the new millennium. *IEEE Computer*, pp. 28-35, Jul. 2000.
K. Olukotun, B. Nayfeh, L. Hammond, K. Wilson, and K. Chang. The Case for a Single-Chip Multiprocessor. In *7th International Conference on Architectural Support for Programming Languages and Operating Systems*, pp. 2-11, Oct. 1996.
A. Roth, C. B. Zilles, and G. S. Sohi. Microarchitectural Miss/Execute Decoupling. In *MEDEA Workshop*, 6 pages, Oct. 2000.
H. Sharangpani and K. Aurora. Itanium Processor Microarchitecture. *IEEE Micro*, pp. 24-42, Sep.-Oct. 2000.
J. E. Smith. Decoupled Access/Execute Computer Architecture. In *9th International Symposium on Computer Architecture*, pp. 290-308, Jul. 1982.
S. Srinivasan and A. Lebeck. Load Latency Tolerance in Dynamically Scheduled Processors. In *31st International Symposium on Microarchitecture*, pp. 148-159, Nov. 1998.
P.Wang, H. Wang, R. Kling, K. Ramakrishnan, and J. Shen. Register Renaming and Scheduling for Dynamic Execution of Predicated Code. In 7th IEEE International Symposium on High Performance Computer Architecture, pp. 15-25, Jan 2001.
D. Marr, et al., "Hyper-Threading Technology Architecture and Microarchitecture," *Intel Technology Journal*, Q1, pp. 1-12, 2002.
T. Aamodt, A. Moshovos, and P. Chow, The Predictability of Computations that Produce Unpredictable Outcomes. In *5th Workshop on Multithreaded Exection, Architecture and Compilation*, pp. 1-11, Austin, Texas, Dec. 2001.
H. Agrawal and J. R. Horgan. Dynamic Program Slicing. In *Proceedings of the SIGPLAN Conference on Programming Language Design and Implementation*, pp. 246-256, Jun. 1990.
M. Annavaram, J. Patel, E. Davison. Data Prefetching by Dependence Graph Precomputation. In *28th International Symposium on Computer Architecture*, pp. 52-61, Jul. 2001.
K. Cooper, P. Schielke, D. Subramanian. An experimental evaluation of list scheduling. Rice University Technical Report 98-326, 15 pages, Sep. 1998.
R. Ghiya, D. Lavery, and D. Sehr. On the importance of points-to analysis and other memory disambiguation methods for C programs. In SIGPLAN Conference on Programming Language Design and Implementation, pp. 47-58, Jun. 2001.

A. V. Goldberg and R. E. Tarjan. A new approach to the maximum-flow problem. In Journal of the Association for Computing Machinery, 35(4):921-940, Oct. 1988.
R. Gupta and M. L. Soffa. Hybrid slicing: an approach for refining static slicing using dynamic information. In the Foundations of Software Engineering, pp. 29-40, Sep. 1995.
G. Hinton and J. Shen. Intel's multi-threading technology. *Microprocessor Forum*, pp. 1-51, Oct. 2001.
R. Krishnaiyer, D. Kulkarni, D. Lavery, W. Li, C. Lim, J. Ng, D. Sehr. An Advanced Optimizer for the IA-64 Architecture, *IEEE Micro*, pp. 60-68, Nov.-Dec. 2000.
W. Landi and B. Ryder. A Safe Approximate Algorithm for Interprocedural Pointer Aliasing. In *SIGPLAN '92 Conference on Programming Language Design and Implementation*, pp. 235-248, Jun. 1992.
S. Liao. Suif Explorer. PhD thesis, Stanford University, Aug. 2000, Stanford Technical Report CSL-TR-00-807, 160 pages.
S. Liao, A. Diwan, R. Bosch, A. Ghuloum, M. S. Lam. SUIF Explorer: an interactive and interprocedural parallelizer. In Proceedings of the 7th ACM SIGPLAN Symposium on Principles and Practice of Parallel Programming, pp. 37-48, Atlanta, Georgia, May 1999.
C. K. Luk, Tolerating Memory Latency through Software—Controlled Pre-Execution in Simultaneous Multithreading Processors, In *28th International Symposium on Computer Architecture*, pp. 40-51, Jun. 2001.
D. Marr, F. Binns, D. Hill, G. Hinton, D. Koufaty, J. Miller, M. Upton. Hyper-threading technology architecture and microarchitecture. *Intel Technology Journal*, vol. 6, Issue on Hyper-threading, pp. 1-12, Feb. 2002.
A. Moshovos, D. Pnevmatikatos, A. Baniasadi. Slice procesors: an implementation of operation-based prediction. In International Conference on Supercomputing, pp. 321-334, Jun. 2001.
H. Wang, P. Wang, R. D. Weldon, S. Ettinger, H. Saito, M. Girkar, S. Liao, J. Shen. Speculative precomputation: exploring use of multithreading technology for latency. In *Intel Technology Journal*, vol. 6, Issue on Hyperthreading, pp. 1-14, Feb. 2002.
P. Wang, H. Wang, J. Collins, E. Grochowski, R. Kling, J. Shen. Memory latency-tolerance approaches for Itanium processors: out-of-order execution vs. speculative precomputation. In *Proceedings of the 8th IEEE High-Performance Computer Architecture*, Cambridge, Massachusetts. 10 pages, Feb. 2002.
C. Zilles and G. Sohi. Understanding the backward slices of performance degrading instructions. In *27th International Symposium on Computer Architecture*, Vancouver, BC, Canada, 10 pages, May 2000.
C. Zilles and G. Sohi. Execution-based prediction using speculative slices. In *28th International Symposium on Computer Architecture*, Goteborg, Sweden, pp. 2-13, Jul. 2001.
T. Aamodt, P. Marcuello, P. Chow, P. Hammarlund, H. Wang, and J. Shen. Hardware Support for Prescient Instruction Prefetch. In 10th International Symposium on High Performance Computer Architecture, 9 pages, Feb. 2004.
A. Agarwal, B. Lim, D. Kranz, and J. Kubiatowicz. April: A Processor Architecture for Multiprocessing. In 17th International Symposium on Computer Architecture, pp. 104-114, Jun. 1990.
M. Annavaram, J. M. Patel, and E. S. Davidson. Data Prefetching by Dependence Graph Precomputation. In *28th* International Symposium on Computer Architecture, pp. 52-61, Goteborg, Sweden, Jun. 2001. ACM.
R. S. Chappell, S. P. Kim, S. K. Reinhardt, and Y. N. Patt., Simultaneous Subordinate Microthreading (SSMT). In *26th* International Symposium on Computer Architecture, pp. 186-195, Atlanta, GA, May 1999. ACM.
R. S. Chappell, F. Tseng, A. Yoaz, and Y. N. Patt. Difficult-path Branch Prediction Using Subordinate Microthreads. In 29th International Symposium on Computer Architecture, Anchorage, AK, pp. 306-317, May 2002.
J. Collins, D. Tullsen, H. Wang, and J. Shen. Dynamic Speculative Precomputation. In Proceedings of the 34th Annual ACM/IEEE International Symposium on Microarchitecture, pp. 306-317, Austin, TX, Dec. 2001. ACM.
R. Eickemeyer, R. Johnson, S. Kunkel, B.-H. Lim, M. Squillante, and C. Wu. Evaluation of Multithreaded Processors and Thread Switch

(56) References Cited

OTHER PUBLICATIONS

Policies. In International Symposium on High Performance Computing, pp. 75-90, Fukuoka, Japan, Nov. 1997.

M. K. Farrens and A. R. Pleszkun. Strategies for Achieving Improved Processor Throughput. In 18th International Symposium on Computer Architecture, pp. 362-369, May 1991.

J. W. Haskins Jr., K. R. Hirst, and K. Skadron. Inexpensive Throughput Enhancement in Small-Scale Embedded Microprocessors with Block Multithreading: Extensions, Characterization, and Tradeoffs. In 20th International Performance, Computing, and Communications Conference, pp. 319-328, Apr. 2001.

D. Kim, S. Liao, P. Wang, J. del Cuvillo, X. Tian, X. Zou, H. Wang, D. Yeung, M. Girkar, and J. Shen. Physical Experimentation with Prefetching Helper Threads on Intel's Hyper-Threaded Processors. In International Symposium on Code Generation and Optimization, 12 pages, Mar. 2004.

D. Kim and D. Yeung. Design and Evaluation of Compiler Algorithms for Pre-Execution. In 10th Architectural Support for Programming Languages and Operating Systems, pp. 159-170, Oct. 2002.

S. Liao, P. Wang, H. Wang, G. Hoflehner, D. Lavery, and J. Shen. Post-Pass Binary Adaptation for Software-Based Speculative Precomputation. In ACM Conference on Programming Language Design and Implementation, pp. 117-128, Jun. 2002.

T. C. Mowry, C. Q. Chan, and A. K. Lo. Comparative Evaluation of Latency Tolerance Techniques for Software Distributed Shared Memory. In 4th International Symposium on High Performance Computer Architecture, 12 pages, Feb. 1998.

T. C. Mowry, M. S. Lam, and A. Gupta. Design and Evaluation of a Compiler Algorithm for Prefetching. In 5th International Conference on Architectural Support for Programming Languages and Operating Systems, pp. 62-73, Oct. 1992.

O. Mutlu, J. Stark, C. Wilkerson, and Y. Patt. Runahead Execution: An Alternative to Very Large Instruction Windows for Out-of-order Processors. In 9th International Symposium on High Performance Computer Architecture, 12 pages, Jan. 2003.

V. Panait, A. Sasturkar, and W.-F. Wong. Static Identification of Delinquent Loads. In International Symposium on Code Generation and Optimization, 12 pages, Mar. 2004.

J. Redstone, S. Eggers, and H. Levy. Mini-threads: Increasing TLP on Small-Scale SMT Processors. In 9th International Symposium on High Performance Computer Architecture, 12 pages, Feb. 2003.

D. M. Tulisen, J. L. Lo, S. J. Eggers, and H. M. Levy. Supporting Fine-Grained Synchronization on a Simultaneous Multithreading Processor. In 5th International Symposium on High Performance Computer Architecture, 5 pages, Jan. 1999.

C. A. Watdspurger and W. E. Weihl. Register Relocation: Flexible Contexts for Multithreading. In 20th International Symposium on Computer Architecture, pp. 120-130, May 1993.

Agarwal, et al., "The MIT Alewife Machine: Architecture and Performance", 1995; ACM. Jun. 22-24, 1995.

First Office Action from foreign counterpart China Patent Application No. 200310113081.8, mailed Jul. 29, 2005, 11 pages.

Second Office Action from foreign counterpart China Patent Application No. 200310113081.8, mailed Jun. 9, 2006, 9 pages.

First Office Action from foreign counterpart China Patent Application No. 200710104280.0, mailed Jun. 13, 2008, 12 pages.

Second Office Action from foreign counterpart China Patent Application No. 200710104280.0, mailed Feb. 27, 2009, 19 pages.

First Office Action from foreign counterpart China Patent Application No. 200610019818.3, mailed Jun. 29, 2007, 15 pages.

Second Office Action from foreign counterpart China Patent Application No. 200610019818.3, mailed May 23, 2008, 11 pages.

Office Action from U.S. Appl. No. 11/134,687 mailed Aug. 14, 2009, 18 pages.

Office Action from U.S. Appl. No. 11/134,687 mailed Dec. 19, 2008, 22 pages.

Office Action from U.S. Appl. No. 11/134,687 mailed Feb. 2, 2010, 19 pages.

Notice of Reexamination from foreign counterpart China Patent Application No. 200710104280.0, mailed Apr. 28, 2010, 18 pages.

Invention Patent Certificate from foreign counterpart China Patent Application No. 200310113081.8, mailed Apr. 18, 2007, 2 pages.

Invention Patent Certificate from foreign counterpart Hong Kong Patent Application No. 05101289.3, mailed Dec. 14, 2007, 2 pages.

* cited by examiner

PROGRAMMABLE EVENT DRIVEN YIELD MECHANISM WHICH MAY ACTIVATE OTHER THREADS

BACKGROUND

1. Field

The present disclosure pertains to the field of processing apparatuses and systems that process sequences of instructions or the like, as well as certain instruction sequences to program such apparatuses and/or systems. Some embodiments relate to monitoring and/or responding to conditions or events within execution resources of such processing apparatuses.

2. Description of Related Art

Various mechanism are presently used to change the flow of control (i.e., the processing path or instruction sequence being followed) in a processing system. For example, a jump instruction in a program sequence explicitly and precisely causes a jump to a new address. The jump instruction is an example of an explicit change of the control flow because the instruction directs the processor to jump to a location and continue executing at that point. A traditional jump instruction is "precise" (or synchronous) because the jump occurs as a direct result of execution of the jump instruction.

Another traditional example of a change in the flow of control is an interrupt. An interrupt may be an external signal provided to an apparatus such as a processor. The processor may respond by jumping to an interrupt handler, a routine that handles the event(s) signaled by a particular interrupt. Interrupts are typically also relatively precise in that they are recognized and acted upon by a processor within a particular window of time in relation to their receipt. In particular, interrupts are often serviced at the next instruction boundary after they are received internally. In some cases, only the operating system or other software operating at a high privilege level is allowed to mask interrupts, so a user program may have no opportunity to enable or disable these control flow changing events.

Another traditional example of a change in the flow of control occurs in response to an exception. An exception typically reflects a predefined architectural condition such as a result of a mathematical instruction meeting certain criteria (denormal, underflow, overflow, not a number, etc.). Some exceptions can be masked, for example, by setting a bit in a control register. If an exception occurs and is not masked, then an exception handler is called to handle the exception.

Another technique that changes the flow of control of a processor is the use of breakpoints. Breakpoints are typically used in debugging. A particular instruction address may be programmed into a breakpoint register. The processor may do various acts (other than continue with the program as usual) when a breakpoint is active and the target address is reached. Breakpoints allow single-stepping through a program, among other things.

Multi-threading is a technique by which processor hardware may be utilized by multiple different threads. Multi-threaded processors may switch between threads for a variety of reasons. For example, a processor may have an algorithm that automatically switches between available threads. Other processors use switch-on-event multithreading (SoEMT), whereby certain events such as a cache miss may give rise to a thread switch. Thread switching can be considered a change of control flow because the processor switches the sequence or stream which it executes.

In one prior art reference, a quiesce instruction is detailed (see U.S. Pat. No. 6,493,741). In one example, the quiesce instruction stops processing in one thread until either a timer expires or a memory write to a memory location occurs. Therefore, an instruction such as the quiesce instruction may itself trigger the temporary cessation of processing of the thread containing the quiesce instruction and a switch to another thread.

BRIEF DESCRIPTION OF THE FIGURES

The present invention is illustrated by way of example and not limitation in the Figures of the accompanying drawings.

DETAILED DESCRIPTION

The following description describes embodiments of a programmable event driven yield mechanism which may activate other threads. In the following description, numerous specific details such as processor types, microarchitectural conditions, events, enablement mechanisms and the like are set forth in order to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

In some embodiments, disclosed techniques may allow a program to actively monitor and respond to conditions of the execution resources which execute the program while executing the program. Effectively, such embodiments may incorporate real-time execution resource operating condition feedback to improve performance. If the execution resources encounter execution delaying conditions, the program execution may be disrupted to make adjustments. In some embodiments, a handler may be activated and may spawn a helper thread to attempt to improve execution of the original thread.

In other embodiments, the disruption may be accomplished by switching to another program thread that may not be a helper thread. These and other embodiments may in some cases advantageously improve processing throughput and/or allow optimizations to be tailored to particular hardware.

Figure 1:
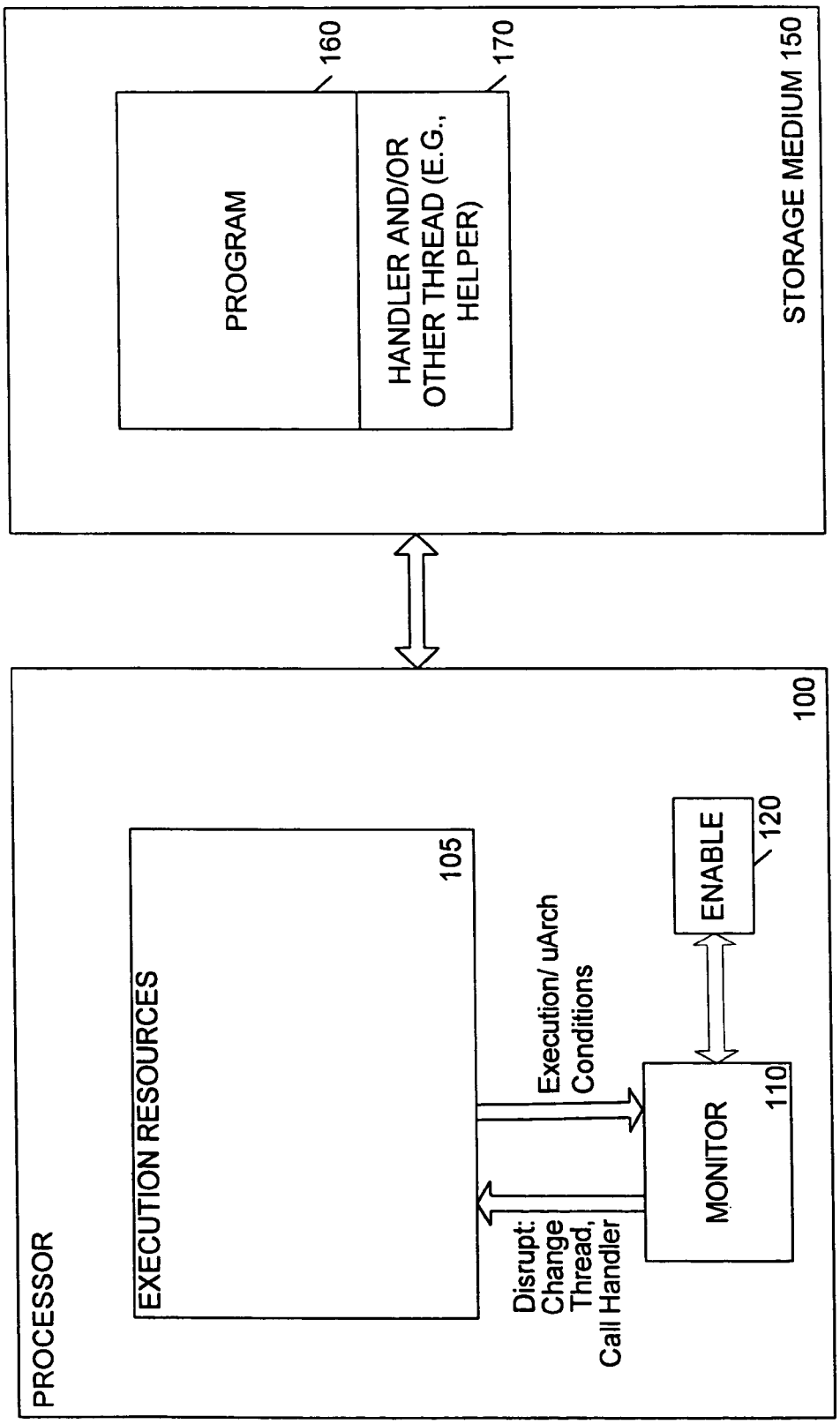
FIG. 1 illustrates one embodiment of a system that can detect and respond to processing conditions of execution resources.

Turning to FIG. 1, one embodiment of a system that can detect and respond to processing conditions of execution resources is illustrated. In the embodiment of FIG. 1, execution resources 105, a monitor 110, and enable logic 120 form a portion of a processor 100 that is capable of executing instructions. The execution resources may include hardware resources that may be integrated into a single component or integrated circuit in some embodiments. However the execution resources may include software or firmware resources or any combination of hardware and software and/or firmware that may also be used in execution of program instructions. For example, firmware may be used as a part of an abstraction layer or may add functions to processing hardware, as may software. Software also may be used to emulate part or all of an instruction set or to otherwise assist in processing.

The processor may be any of a variety of different types of processors that execute instructions. For example, the processor may be a general purpose processor such as a processor in the Pentium® Processor Family or the Itanium® Processor Family or other processor families from Intel Corporation or other processors from other companies. Thus, the processor may be a reduced instruction set computing (RISC) processor, a complex instruction set computing (CISC) processor, a very long instruction word (VLIW) processor, or any hybrid or alternative processor type. Moreover, special purpose processors such as network or communication processors, co-processors, embedded processors, compression engines, graphics processors, etc., may use disclosed techniques. As integration trends continue and processors become even more complex, the need to monitor and react to internal performance indicators may further increase, thus making presently disclosed techniques more desirable. However, due to rapid technological advance in this area of technology, it is difficult to foresee all the applications of disclosed technology, though they may be widespread for complex hardware that executes program sequences.

As shown in FIG. 1, the processor 100 is coupled to a storage medium 150 such as a memory. The storage medium 150 may be a memory subsystem having various levels of hierarchy which may include but are not limited to various levels of cache memory, system memory such as dynamic random access memory or the like, and non-volatile storage such as flash memory (e.g. memory stick etc), a magnetic or optical disk. As illustrated, the storage medium stores a program 160 and a handler and/or other thread such as a helper thread 170.

To allow the monitor to monitor the desired events, the monitor 110 may be coupled to various portions of execution resources in order to detect particular conditions or to be informed of certain microarchitectural events. Signal lines may be routed to the monitor 110, or the monitor may be strategically placed with or integrated with relevant resources. The monitor may include various programmable logic or software or firmware elements or may be custom designed to detect a particular condition. The monitor tracks the various events or conditions, and if the events or conditions it is programmed to detect occur, then the execution resources 105 are signaled to disrupt the normal control flow the program would otherwise follow. As indicated in FIG. 1, the disruption may result in an event handler being called or a thread switch occurring.

One example of a specific detectable condition is that data may be missing from a cache memory, resulting in the event of a cache miss occurring. In fact, a program may generate a pattern of memory accesses that causes repeated cache misses, thereby degrading performance. Such an occurrence of a certain number of cache misses within a period of time or during execution of a portion of code is one example of an event that indicates a relatively low level of progress is being made in executing that section of code.

Other detectable events which may be low progress indicators may relate to various other microarchitectural or structural details of the execution resources. A monitor may detect a condition involving one or more of a stall of a resource, a cache event, a retirement event, a branch or branch prediction result, an exception, a bus event, or a variety of other commonly monitored or performance-impacting events or conditions. The monitor may count or otherwise time, quantify, or characterize such events or conditions, and may be programmable when a particular metric associated with one or more events or conditions occurs.

Figure 2:
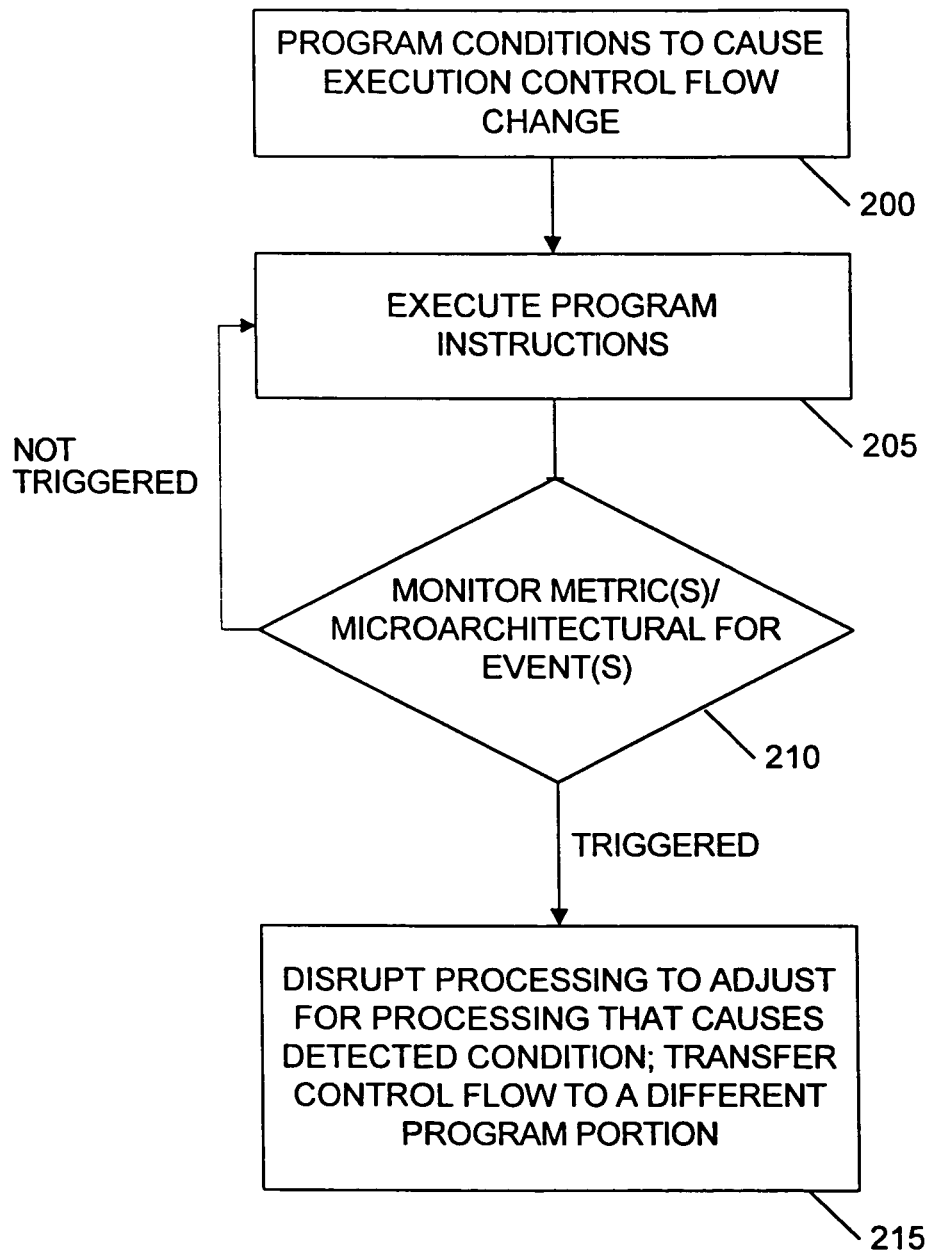
FIG. 2 illustrates a flow diagram of operations for one embodiment of the system of FIG. 1.

FIG. 2 illustrates a flow diagram of operations for one embodiment of the system of FIG. 1. As indicated in block 200 of FIG. 2, the program 160 may set conditions to cause a change in the execution control flow. For example, the enablement logic 120 may control both activation of the monitor and which event(s) to detect. Alternatively, the enablement logic 120 may enable and/or mask events, and the monitor 110 may itself also be programmable for further flexibility in specifying the events or conditions within the execution resources or system that are tracked. In either case, the program 160 itself may specify conditions that are to be watched during its own execution. The program 160 may also provide the handler or thread 170 which is activated when the monitored condition(s) occur. For example, the program may be a program which includes a main thread and a helper thread or helper routine that attempts to improve execution of the main thread if conditions the program specifies occur.

As indicated in block 205, the program instructions are executed. Execution of the program causes the state of the execution resources to change. For example, a variety of conditions may occur or be present that inhibit forward progress in execution of the program. As indicated in block 210, the various processing metrics and/or microarchitectural conditions may be monitored to determine if the triggering event programmed in block 200 occurs. If the triggering state does not occur in block 210, the monitor is not triggered, and program execution continues by returning to block 205.

In some cases, the triggering state bears only an indirect relationship to execution of any single instruction. For example, a prior art breakpoint detector typically causes a break when an instruction pointer reaches a designed address. Such breakpoints are precise because a particular instruction (i.e., its address) directly triggers the break. Also, the prior art quiesce instruction itself causes a thread to stop at least temporarily. In contrast, some embodiments utilizing disclosed techniques trigger control flow changes on a set of conditions that are not necessarily caused by a single instruction, but rather may be caused by the overall program flow and/or system environment. Thus, while the monitor may repeatedly trigger at the same instruction execution state in a single system, other conditions, environments, system, etc., may cause different trigger points for the same program. In this sense, disclosed techniques, in some cases, provide an imprecise or asynchronous mechanism generating a control flow change that is not directly tied to an instruction execution boundary. Moreover, such an imprecise mechanism may, in some embodiments, test for events at a less fine granularity than each instruction and/or may delay recognition of events for some period of time because architectural correctness does not depend on any processing-rate-enhancing helper routines executing at any particular point in time.

When the triggering state is detected by the monitor in block 210, processing of the program is disrupted as indicated in block 215. Generally, the system may responsively adjust because processing of the program is occurring inefficiently or in a manner other than the manner the programmer desired. For example, another software routine such as another program portion may be invoked. The other program portion may be another thread unrelated to the original thread or may be a helper thread that helps execute the original thread, for example by prefetching data to reduce cache misses. Alternatively, a program-transparent (e.g., hardware) mechanism may perform some optimizations, reconfiguration (including, but not limited to reconfiguration of the monitor setup), reallocation of resources or the like to hopefully improve processing.

Figure 3:
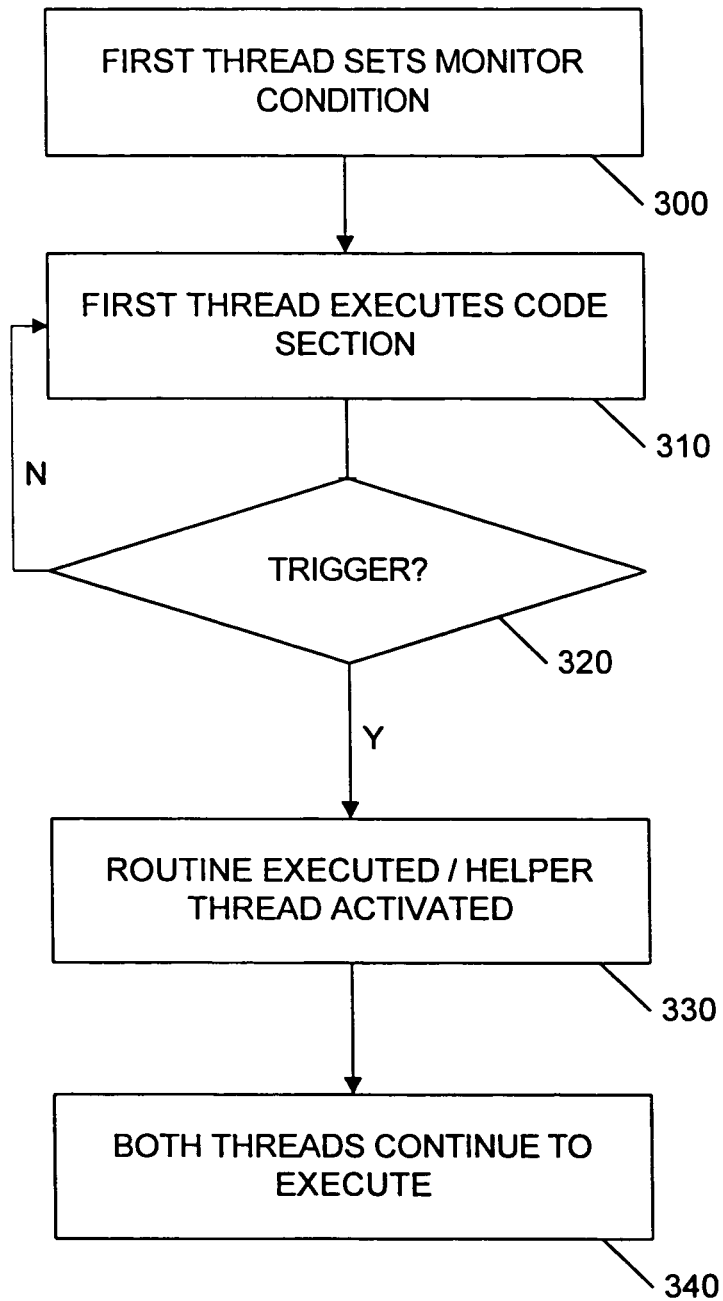
FIG. 3 illustrates a flow diagram of operations for another embodiment of the system of FIG. 1.

One example which invokes a helper thread is illustrated in FIG. 3. In particular, the flow diagram of FIG. 3 details operations for one embodiment of the system of FIG. 1 in which the execution resources are multithreaded resources and the program invokes a helper thread when a certain triggering condition occurs. Thus, as indicated in block 300, a first thread (e.g., a main program) sets a monitor condition. The condition may be any one or more of the variety of conditions discussed herein. The first thread executes a code section as indicated in block 310. If the triggering condition does not occur, as tested in block 320, then the code section continues executing, as indicated in block 310.

If the triggering condition does occur, then a helper thread is activated to assist the first thread as indicated in block 330. The helper thread may be activated by a routine such as a handler routine or just be activated by a thread switch. For example, in one embodiment, the trigger condition signaled by the monitor to the execution resource may cause the execution resource to jump to an event handler that spawns a helper thread. In another embodiment, the helper thread may just be one of the other active threads. In yet another embodiment, one or more special helper thread execution slots may be provided by the processor and the monitor may cause a switch to a helper thread from one of these slots. As indicated in block 340, both threads may then continue to execute. Hopefully, the helper thread, runs ahead and clears up conditions that would otherwise cause the first thread to stall or perform poorly.

Figure 4:
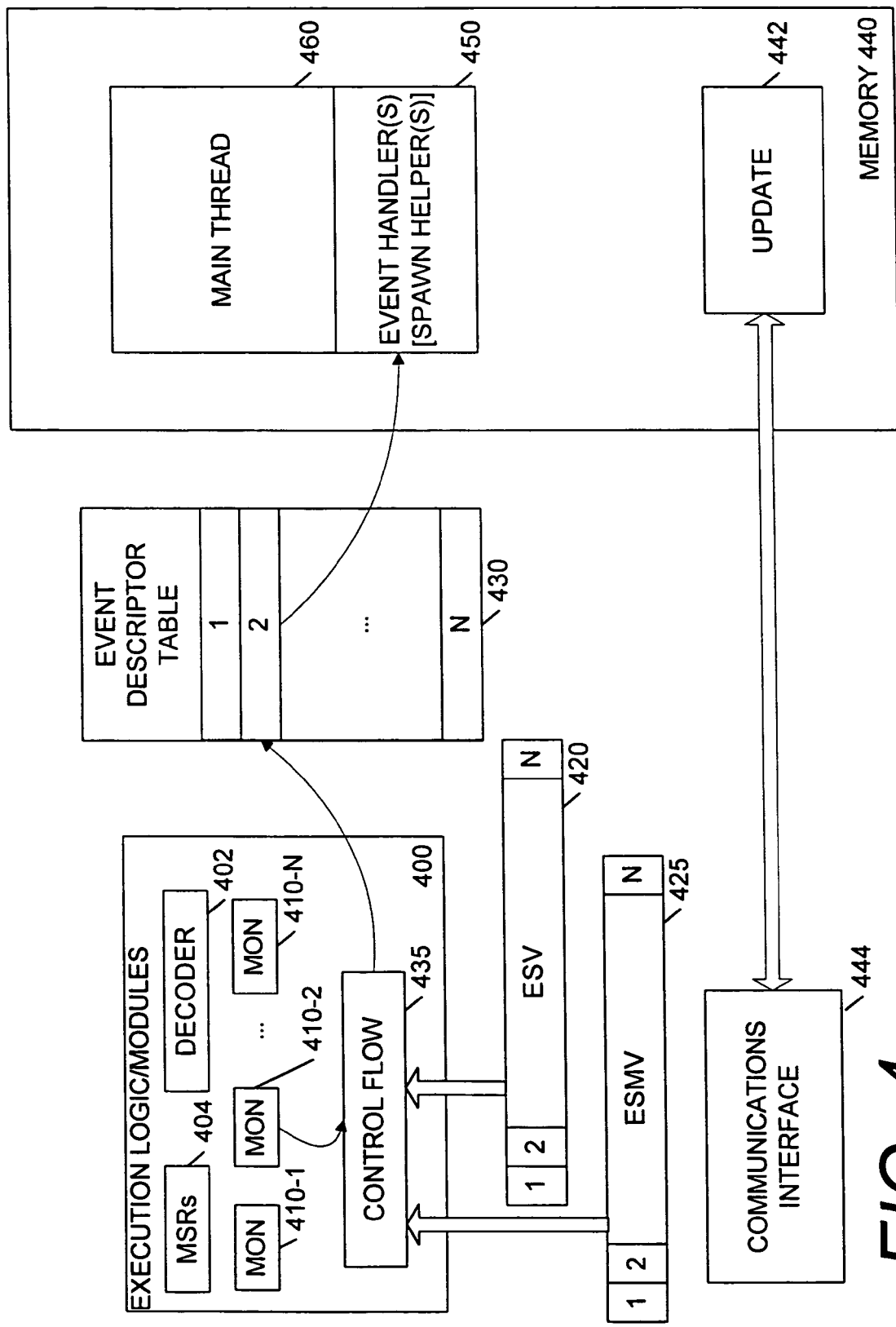
FIG. 4 illustrates another embodiment of a system that can respond to multiple different performance events and/or to composite performance events.

FIG. 4 illustrates another embodiment of a system that can respond to multiple different performance events and/or to composite performance events. In the embodiment of FIG. 4, execution resources, such as execution logic/modules 400 are shown as including a set of N monitors 410-1 through 410-N. Additionally, an event schema vector (ESV) storage location 420 and an event schema vector mask (ESVM) storage location 425 are provided. The embodiment of FIG. 4 shows a number of monitors (N) corresponding to the number of bits in the event schema vector and the event schema mask vector. In other embodiments, there may be different numbers of monitors and bits in these vectors, and the monitors may or may not correlate directly to the bits. For example, a condition involving multiple monitors may correlate to a single vector bit in some embodiments.

The execution resources 400 are optionally coupled to an event descriptor table 430 (EDT), which may be locally implemented on the processor or in a co-processor or system memory. Control flow logic 435 is coupled the monitors 410-1 through 410-N and to receive values from the event schema vector and the event schema vector mask. The control flow logic 435 changes the control flow for processing logic when a condition detected by one or more of the monitors is enabled according to the event schema vector and event schema vector mask.

The embodiment of FIG. 4 also illustrates decode logic 402 and a set of machine or model specific registers 404 (MSRs). Either or both of the decode logic 402 and the model specific registers may be used to program and/or activate the monitors and the event schema vector and mask. For example, MSRs may be used to program the types or number of events that trigger the monitors. MSRs may also be used to program the event schema vector and mask. Alternatively, one or more new dedicated instruction(s) to be decoded by the decoder 402 may be used for either or both of programming the monitors and the event schema vector and mask. For example, a yield instruction may be used to enable disruption of processing a program when a certain set of conditions occurs. Some or all of the conditions may be specified by an operand to the yield instruction or otherwise programmed in advance of its execution. Such a yield instruction may be decoded by the decoder 402 to trigger a microcode routine, to produce a corresponding micro-operation or micro-instruction, or sequences of micro-operations to directly signal appropriate logic, or activate a co-processor or to otherwise implement the yield functionality. The concept of yielding may appropriately describe the instruction in some embodiments in which one thread is allowed to continue after executing the yield instruction but may be slowed at some point by execution of another thread or handler. For example, a largely single-threaded program may invoke extra helper threads and share the processor with those extra helper threads.

In the embodiment of FIG. 4, a memory 440 includes event handlers 450 and a main thread 460. In some embodiments, the event descriptor table may be stored in the same memory or in the same memory hierarchy as the main thread 460 and handlers 450. As previously discussed, the handler(s) may spawn a helper thread to assist the main program in executing efficiently.

The memory 440 may also store an update module 442 to communicate via a communications interface 444. The update module 442 may be a hardware module or a software routine executed by the execution resources to obtain new conditions to be programmed into various monitors and/or enablement logic. The update module 442 may also obtain new helper threads or routines. For example, these may be downloaded by a software program from the vendor of the software program to provide enhanced performance. Thus, the network interface 444 may be any network and/or communication interface that allows information transfer via a communication channel. In some cases, the network interface may interface to the Internet to download new conditions and/or helper routines or threads.

In one embodiment, each bit of the event schema vector indicates the occurrence or non-occurrence of a particular event, with the particular event possibly being a composite event reflective of (and/or expressed via Boolean operations in terms of) a variety of conditions or other events. Occurrence of the particular event may set the bit in the event schema vector. Each bit in the event schema vector may have a corresponding bit in the event schema mask vector. If the mask bit indicates that the particular event is masked, then the control flow logic 435 may disregard the event, although the bit in the event schema vector may remain set due to its occurrence. The user may choose whether to clear the event schema vector when unmasking events. Thus, an event may be masked for some time and handled later. In some embodiments, the user may choose to specify the trigger as a level trigger or an edge trigger, depending upon various issues such as the relationship between event update, sampling and reset (or the hold time of a trigger event in the ESV)

If the mask bit indicates that an event is unmasked, then the control flow logic 435 calls an event handler for that particular event in this embodiment. The control flow logic 435 may vector into the event descriptor table 430 based on the bit position in the event schema vector, and accordingly, the event descriptor table may have N entries corresponding to the N bits in the event schema vector. The event descriptor table may contain a handler address indicating an address to which the control flow logic 435 should re-direct execution, and may also include other information as may be useful in a particular embodiment. For example, privilege level, thread, process, and/or other information may be maintained or updated in the event descriptor table.

In another embodiment, the event descriptor table 430 may not be necessary or may be a single entry that indicates an address for a single event handler to handle all events. In this case, the entry may be stored in a register or other processor storage location. In one embodiment, a single handler may be used, and that handler may access the event schema vector to determine which event occurred and therefore how to respond. In another embodiment, the event schema vector may collectively define an event that causes the control flow logic 435 to call a handler. In other words, the event schema vector may represent a variety of conditions that together signal one event. For example, the event schema mask vector may be used to designate which of the events indicated by the event schema vector must occur to trigger execution of the handler. Each bit may represent a monitor reaching a programmable condition. When all the non-masked monitors reach their respective designated conditions, then the handler is called. Thus, the entire event schema vector may be used to designate some complex composite condition that should trigger the execution of the handler.

In another embodiment, multiple event schema vectors and masks may be used to designate different conditions. The different vectors may vector to different handlers via the event descriptor table or some other mechanism. In another embodiment, some bits of one or more event schema vectors may be grouped to form events that trigger the calling of handlers. A variety of other different permutations will be apparent to those of skill in the art.

Figures 5A, 5B, 5C:
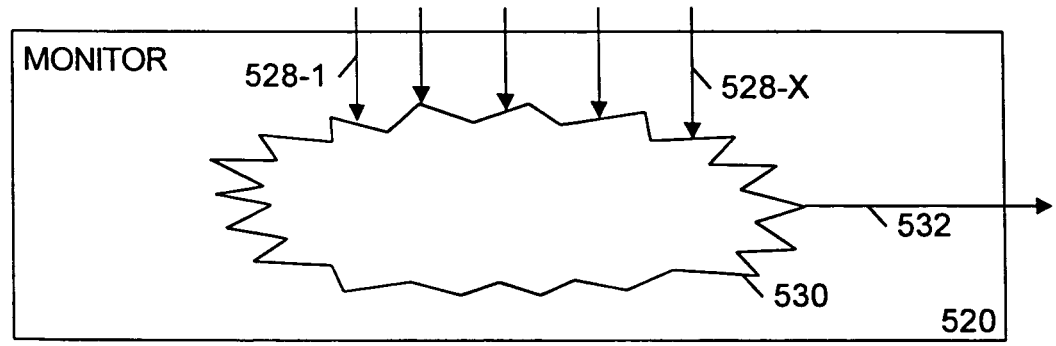
FIG. 5a illustrates one embodiment of a monitor that may recognize composite events.
FIG. 5b illustrates another embodiment of a monitor.
FIG. 5c illustrates another embodiment of a monitor.

FIG. 5a illustrates one embodiment of a monitor 500 that is programmable and capable of interfacing with a variety of performance monitors to signal a composite event. For example, such performance monitors may record occurrences of various microarchitectural events or conditions such as: cache misses incurred at a given level of cache hierarchy, branch retirement: branch misprediction (or retirement of mispredicted branches); trace cache delivery mode changes or events; branch prediction unit fetch requests; cancellations of memory request; cache line splits (count of completion of a split load, store, etc.); replay events; various types of bus transactions (e.g., locks, burst reads, writebacks, invalidates); allocations in a bus sequencer (or only certain types); numerical assist (an underflow, denormal, etc.); execution/retirement of a particular type of instruction or micro-operation (uOP); machine clear (or count of pipeline flushes); resource stalls (register renaming resources, pipeline, etc.); processing of tagged uOPs; instructions or uOPs retired; lines allocated (&/or of a particular state (e.g., M)) in cache; a number of cycles instruction fetch is stalled; a number of cycles instruction length decoder is stalled; a number of cache fetches; a number of lines allocated (or evicted) in cache or the like. These are only a few examples of microarchitectural events or conditions that may be monitored. Various other possibilities as well as combinations of these or other conditions will be apparent to one of skill in the art. Moreover, those and/or other conditions or events may be monitored with any of the disclosed or like monitors in any of the disclosed embodiments.

Performance monitors are often included in processors to count certain events. The programmer may read such performance monitors' counts by manufacturer-defined interfaces such as specific processor macro-instructions like the RDPMC instruction supported by known Intel Processors. See, e.g., Appendix A of Volume III of the Intel Software Developers Guide for the Pentium® 4 Processor. Other internal or micro-instructions or micro-operations may be used to read performance counters in some embodiments. Thus, for example, performance monitors may be adapted for use with disclosed techniques. In some cases, a programmable performance monitor may be modified to provide event signaling capabilities. In other embodiments, performance monitors may be readable by other monitors to establish events.

In the embodiment of FIG. 5a, the monitor 500 may include a set of programmable entries. Each entry may include an entry number 510, an enable field 511, a performance monitor number (EMON #) 512 to specify one of a set of performance monitors and a triggering condition 514. The triggering condition may be, for example, a certain count that is reached, a count that is reached within a certain period, a difference in count, etc. The monitor 500 may include logic to read or otherwise be coupled to receive counts from the designated performance monitors. The monitor 500 signals the control flow logic when the various M conditions occur. A subset of the M entries may be used by selectively programming the enable fields for each entry.

FIG. 5b illustrates another embodiment of a monitor 520. The monitor 520 represents a custom composite event monitor. The monitor 520 receives a set of signals via signal lines 528-1 through 528-X from various execution resources or resource portions and combines them via combinational logic 530. If the proper combination of signals is received, the monitor 520 signals the control flow logic via an output signal line 532.

FIG. 5c illustrates another embodiment of a monitor 540. The monitor 540 includes a table having N entries. Each entry includes an enable field 552, a condition field 554, and a trigger field 556. The condition field may be programmed to specify what combination of input signals is to be monitored. The conditions may or may not be tied to other event detecting structures such as performance monitors, and therefore may be more general than those discussed with respect to FIG. 5a. The trigger field 556 may specify the state of those input signals needed to signal the control flow logic. Again, each entry may be enabled/disabled via the enable field 552. In some embodiments, the condition and trigger fields may be combined. Various combinations of these and other types of known or otherwise available like, simpler, or more complex monitors will be apparent to one of skill in the art.

Figure 6:
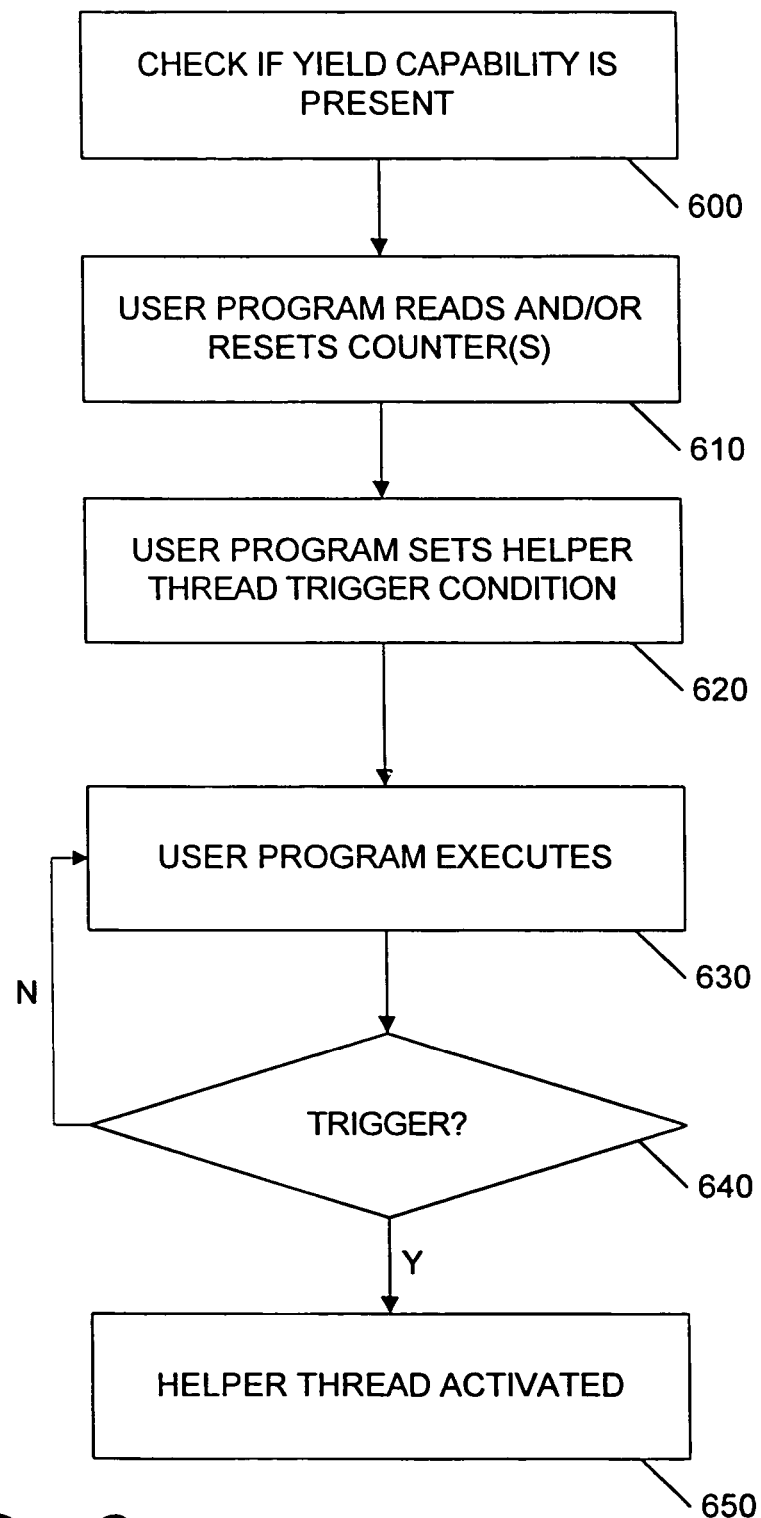
FIG. 6 illustrates a flow diagram for execution of a user program that activates helper threads in response to program-definable triggers according to one embodiment.

FIG. 6 illustrates a flow diagram for execution of a user program that activates helper threads in response to program-definable triggers according to one embodiment. In block 600, the program first tests whether the yield capability is present. The "yield capability" may be used herein as shorthand to refer to the ability of to disrupt processing flow based on a condition or event occurring. Alternatively to testing for yield compatibility support, the yield capability may use opcodes previous defined as no-operation opcodes and/or previously unused or undefined MSRs so that use of the yield capability will have no effect on processor lacking such capabilities. The presence of such capabilities can also be queried via checking special CPU-ID that encodes hints indicating if such capabilities are present on a given processor or platform. Similarly, special instruction such as Itanium's PAL (processor-abstraction layer) call or SALE (system abstraction layer environment) can be used to query the processor specific configuration information including availability of such program-definable yield capability. Assuming the yield capability is present, then the user program may read and/or reset various counters, as indicated in block 610. For example, performance monitor counters may be read so that a delta may be computed, or the values may be reset if that capability is available.

As indicated in block 620, the user program then sets the helper thread trigger condition. The yield capability may be accessible at a low privileged level (e.g., a user level) such that any program or most programs can utilize this feature. For example, the yield capability may be available to ring three privilege level programs in a Pentium® Processor family processor, or the like. Therefore, the user program itself is able to set its own performance-based trigger conditions. A user program or operating system that is aware of existence of such context-sensitive monitor configurations, may choose to save and restore such application specific monitor configuration/setup across thread/process context switch, if the application demands or the operating system can provide persistent monitoring capability.

As indicated in block 630, the user program continues to execute after programming the yield conditions. Whether the yield conditions occur is tested in block 640. If the yield condition does not occur, then program execution continues as indicated in block 630. If the yield condition does occur, then a helper thread is activated, as indicated in block 650. The flowchart form of FIG. 6 tends to imply that a synchronous polling for events occurs, and this approach may be used in some embodiments. However, some embodiments asynchronously react to events when they occur or within a number of clock cycles of when they occur rather than polling for them at certain intervals. In some embodiments, a monitor condition may be set outside of a loop or other code section to detect a particular condition. This concept is demonstrated by the following pseudo-code example for a main thread and a helper thread.

```
main( )
{
    CreateThread(T)
    WaitForEvent( )
    n = NodeArray[0]
    setup Helper Trigger   //Intrinsic
    while(n and remaining)
    {
        work( )
        n->i = n->next->j + n->next->k + n->next->l
        n = n->next
        remaining--
        //Every Stride Time
        //   global_n = n
        //   global_r = remaining
        //   SetEvent( )
    }
    disable Helper Trigger    //Instrinsic
}
T( )
{
    Do Stride times
        n->i = n->next->j + n->next->k + n->next->l
        n = n->next
        remaining--
```

-continued

```
    SetEvent( )
    while(remaining)
    {
        Do Stride times
            n->i = n->next->j + n->next->k + n->next->l
            //Responsible for most effective prefetch
            //due to run-ahead
            n = n->next
            remaining--
        WaitForEvent( )
        if(remaining < global_r)      //Detect Run-Behind
            remaining = global_r     //Adjust by jump ahead
            n = global_n
    }
}
```

One advantage of setting the trigger outside the loop is that compiler optimizations within the loop will not be inhibited. For example, some compilers do not optimize loops or sections of code with intrinsics such as those which may be used to activate the yield capability. By placing such intrinsics outside the loop, interference with compiler optimizations may be removed.

Figure 7:
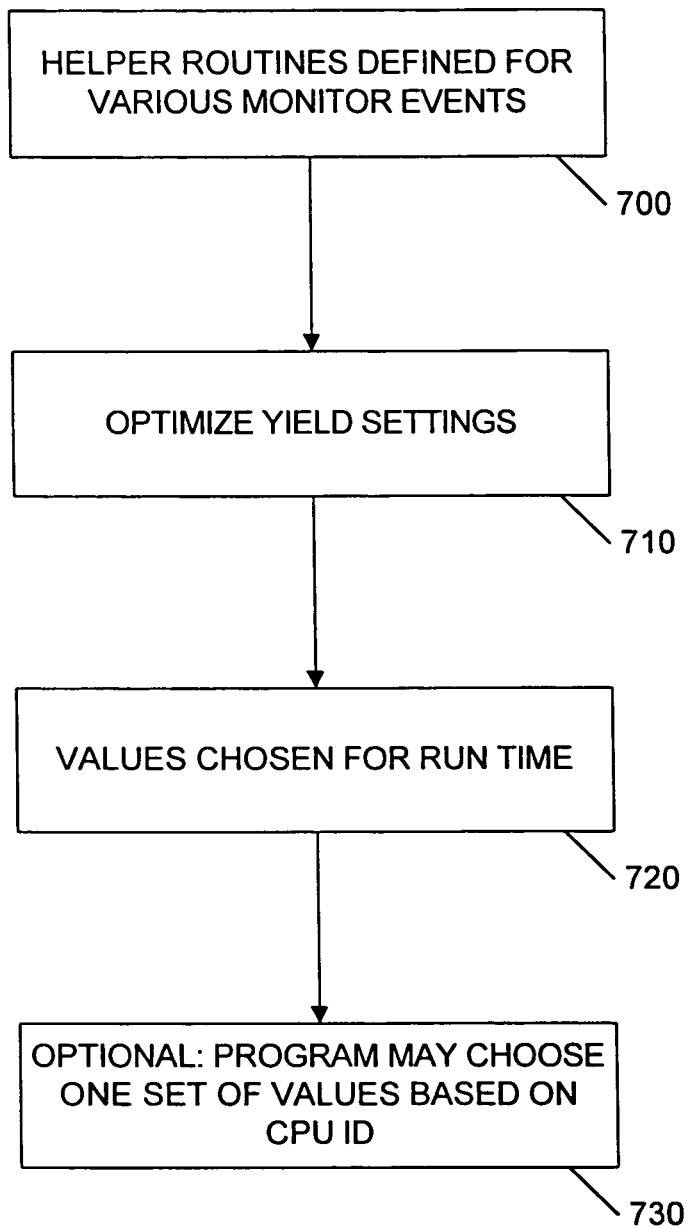
FIG. 7 illustrates a flow diagram for a process of refining monitor settings according to one embodiment.

FIG. 7 illustrates a flow diagram for a process of refining yield settings according to one embodiment. Using a processor with a yield capability or the like, a programmer may design a program as well as helper routines to be invokes under various circumstances as indicated in block 700. Thus, helper routines may be provided for various processing-impeding conditions that the programmer anticipates. The processor can invoke these routines if and when they are needed during execution of the program. The yield settings may include the event schema vector and mask values and/or monitor settings or the like.

On a particular processor, a certain yield setting might result in a favorable execution throughput. However, such determination may be quite difficult manually and thus better derived empirically. Therefore a compiler or other tuning software (a code analyzer) may repeatedly simulate the code with different yield settings, thereby deriving optimal or desirable settings as indicated in block 710. Thus, desirable values for yield settings for runtime may be chosen as indicated in block 720. A program may be simulated on multiple different versions of a processor or multiple different processors, or in multiple different systems to derive different yield settings. A system or processor identification such as a CPU ID may be used by the program to select which yield settings to apply when it runs as indicated in block 730.

Furthermore, the use of a compact group of settings to optimize performance may facilitate software updates. For example, new yield values may be downloaded to optimize performance for a given processor or may be used to update software when new processors are released. Such new values may allow a binary or modular modification which does not substantially disturb or jeopardize the functionality of the existing software.

Figure 8:
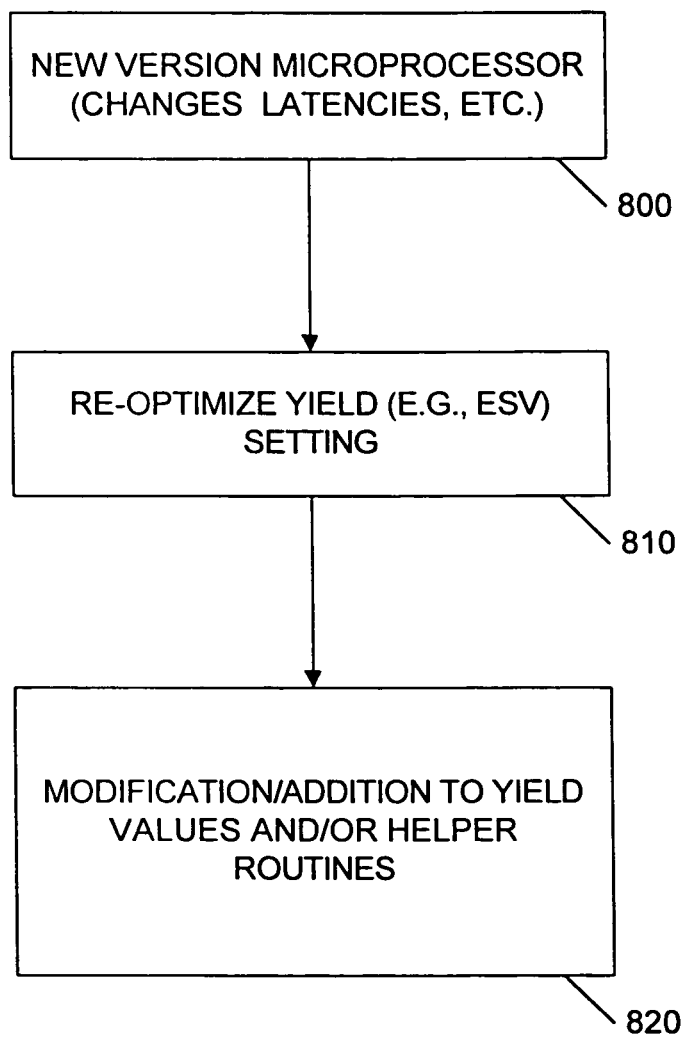
FIG. 8 illustrates a flow diagram for a process of updating software according to one embodiment.

FIG. 8 illustrates a flow diagram for a process of updating software according to one embodiment. As indicated in block 800, a new version of a microprocessor is released. The new version may have different latencies associated with microarchitectural events such as cache misses. Therefore, a routine previously written to activate helper threads after a given number of cache misses may be less effective due to a new cache miss latency. Therefore, the yield settings are re-optimized as indicated in block 810.

Once new settings are derived, the program can be updated (e.g., via an update module that may be a part of the program)

as indicated in block 820. A modification or addition to the yield values may be performed, depending on the details of the implementation. Moreover, additional or different helper routines may be added to assist on the new processor implementations. In either case, the yield capability can enable the delivery of performance enhancements after the initial delivery of the software. Such a capability may be quite advantageous in a great variety of scenarios, and may be used just to provide new optimizations without any change in the underlying hardware. Additionally, the underlying software may be maintained in some cases. For example, if a helper routine is written to deal with a synthetic event (e.g., bad cache misses), then on different hardware the composition of events which triggers this routine may be changed without changing the actual routines themselves. For example, the monitor configuration values and/or ESV/ESVM values may be changed and the routines left in tact.

Figure 9A:
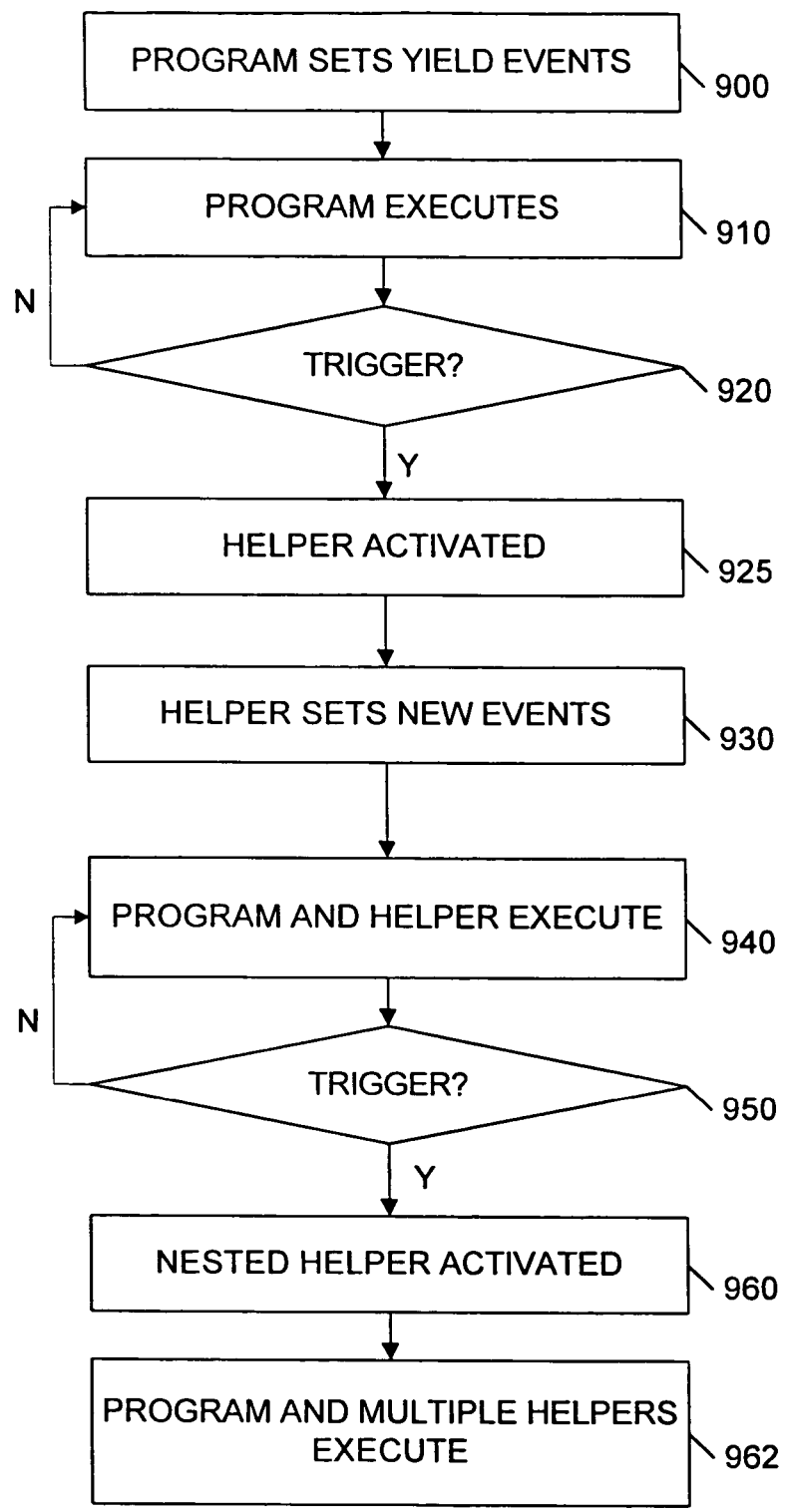
FIG. 9a illustrates a flow diagram in which multiple nested helper threads are activated to assist processing of a program.

The effectiveness of disclosed techniques may be further enhanced by creating nested helper threads, and FIG. 9a illustrates one example of such usage. In the embodiment of FIG. 9a, the program sets the yield event(s) in block 900. The program continues execution in block 910. Whether a yield event (a trigger) occurs is tested in block 920. If no yield event occurs, then program execution continues as shown via block 910. If a yield event occurs, then a helper thread is activated as indicated in block 925. The helper thread sets another yield event as indicated in block 930. Thus, the helper thread effectively identifies a further condition that indicates that further processing assistance may be helpful. Such further condition may indicate whether the first helper thread is effective and/or may be designed to indicate a further condition that may be suspected to develop as a result of or in spite of activation of the first helper thread.

As indicated in block 940, both the program and the helper thread are active and executing threads. These threads execute concurrently in the sense that they are both active and executing in a multithreaded processing resource. Whether the new trigger condition has occurred by the combination of both the program and the helper thread is tested in block 950. If the new triggering condition does not occur, then execution for both threads continues as indicated in block 940. If the new triggering condition does occur, a second or nested helper thread is activated as indicated in block 960. Thereafter, the program and multiple helper threads may be active and execute as indicated in block 962. Thus, multiple nested helper threads may be employed in some embodiments.

In one embodiment, multiple helper threads (either nested or non-nested) may be activated by the use of virtual threads. Rather than dedicating a full set of resources to expand the number of threads a processor can handle, a processor may effectively cache context data (in a cache location, a register location, or other storage location). Accordingly, one physical thread slot may be rapidly switched between multiple threads.

Figure 9B:
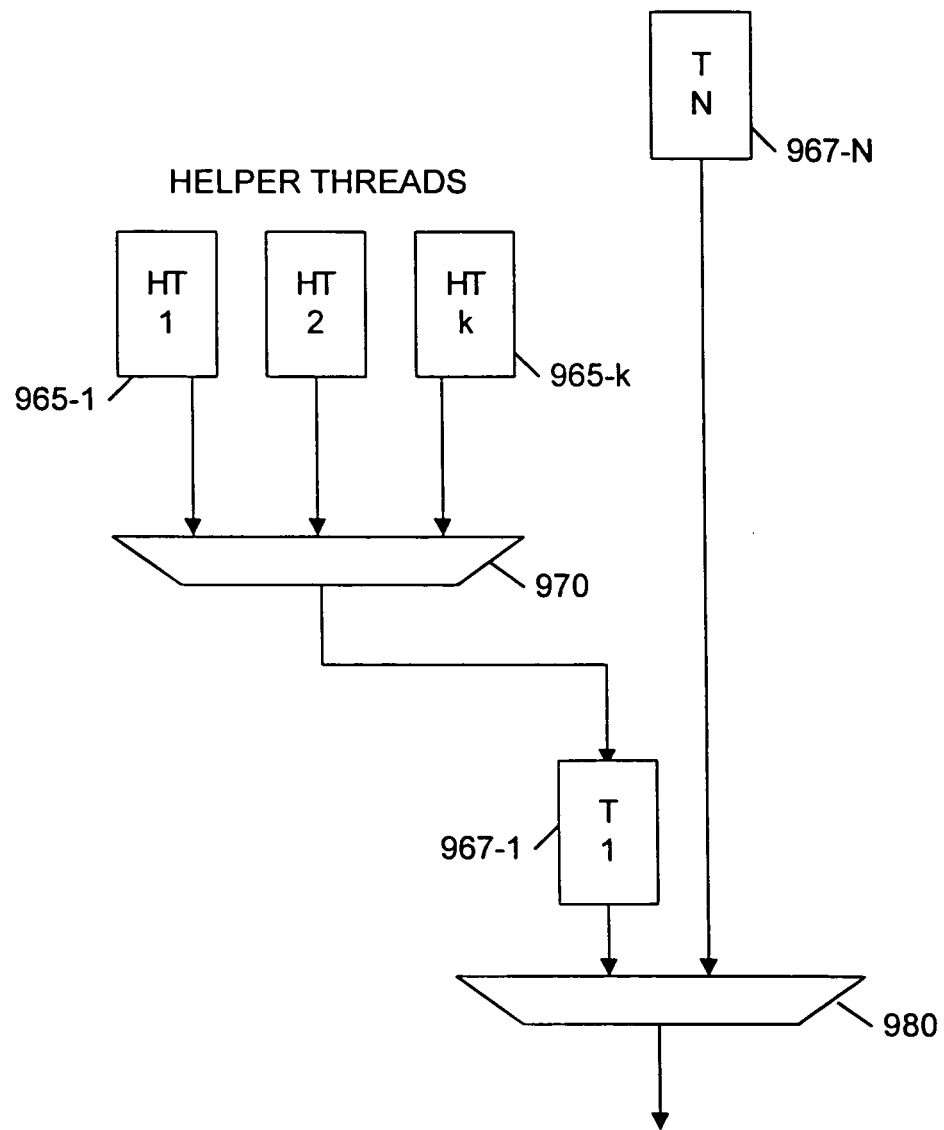
FIG. 9b illustrates thread switching logic for one embodiment which supports virtual threads.

For example, the embodiment of FIG. 9b illustrates thread switching logic according to one embodiment that allows virtual threads to be switched into a limited number of physical thread slots which have dedicated hardware to maintain a thread context. In the embodiment of FIG. 9b, a plurality of helper threads 965-1 through 965-k may be presented to a virtual thread switcher 970. The virtual thread switcher 970 may also include other logic and/or microcode (not shown) to swap context information between the new and previously selected helper threads. The virtual thread switcher 970 may be triggered to switch threads by either a synchronous or an asynchronous stimulus. For example, an asynchronous event defined by a yield-type of instruction may cause a thread switch between the virtual threads. Additionally, helper threads may include synchronous means such as a halt, quiesce, or other type of execution-stopping instruction to signal a switch to another thread. The virtual thread switch logic 970 presents a subset (e.g., in the embodiment of FIG. 9b, one) of the virtual threads to the processor thread switch logic 980. The processor thread switch logic 980 then switches between one of the helper threads as a first thread 967-1 and its other N−1 threads, up to thread 967-N.

Figure 10A:
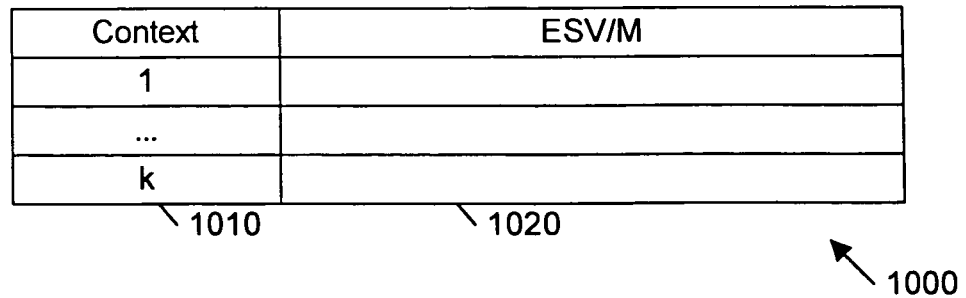
FIG. 10a illustrates one embodiment of a context-sensitive event schema vector and mask implementation.

In some embodiments, it may be advantageous to confine the yield capability to a particular program or thread. Therefore, the yield capability may be made context sensitive or non-promiscuous. For example, FIG. 10a illustrates one embodiment of a context-sensitive event schema vector and mask implementation. In the embodiment of FIG. 10a, a storage area 1000 includes a context indicator field 1010 associated with each event schema vector and mask storage location 1020. The context indicator field identifies the context to which each event schema vector and mask pair applies. For example, a context value such as value of a control register (e.g., CR3 in an x86 processor indicating operating system process ID) may be used. Additional or alternatively, thread number information may be used to define context. Therefore, in some embodiment, when a particular context is active, certain context specific events may be enabled to disrupt processing. As such, the yield mechanism may be non-promiscuous in that its events only affect certain contexts.

Figure 10B:
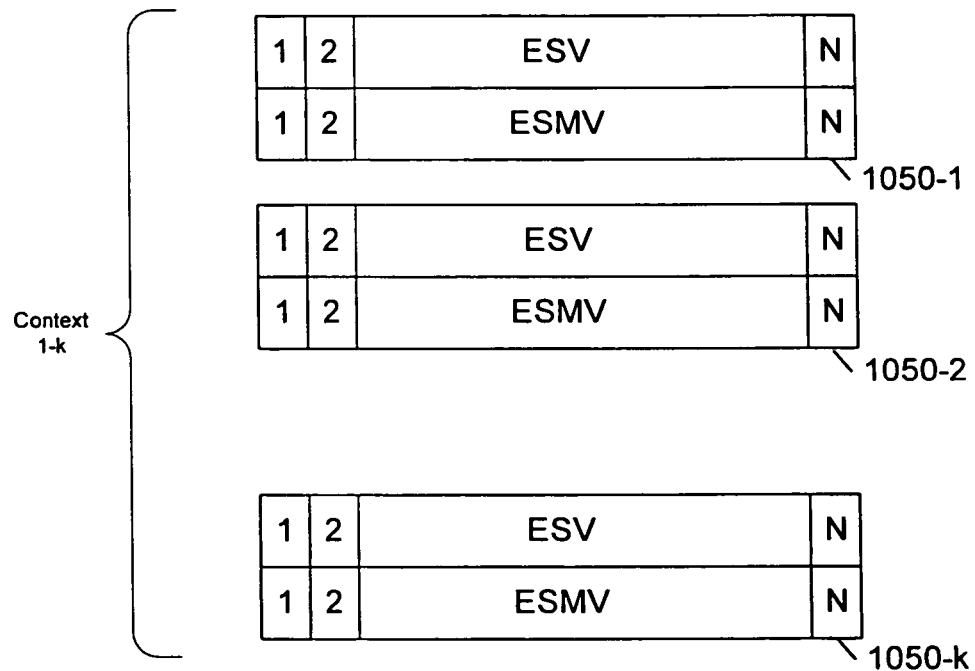
FIG. 10b illustrates one embodiment of a context-sensitive event schema vector and mask implementation.

FIG. 10b illustrates another embodiment of a context-sensitive event schema vector and mask implementation. In the embodiment of FIG. 10b, an integer number k of contexts may be handled by providing one set of event schema vector and mask locations 1050-1 through 1050-k for each of the k contexts. For example, there may be k threads in a multi-threaded processor, and each thread may have an event schema vector and mask or like yield-enablement mechanism. Notably, in other embodiments, it may be undesirable to track events only in certain contexts. For example, events may be reflective of overall processing activity and/or events may be pertain to or be caused by to multiple related threads.

Figure 11:
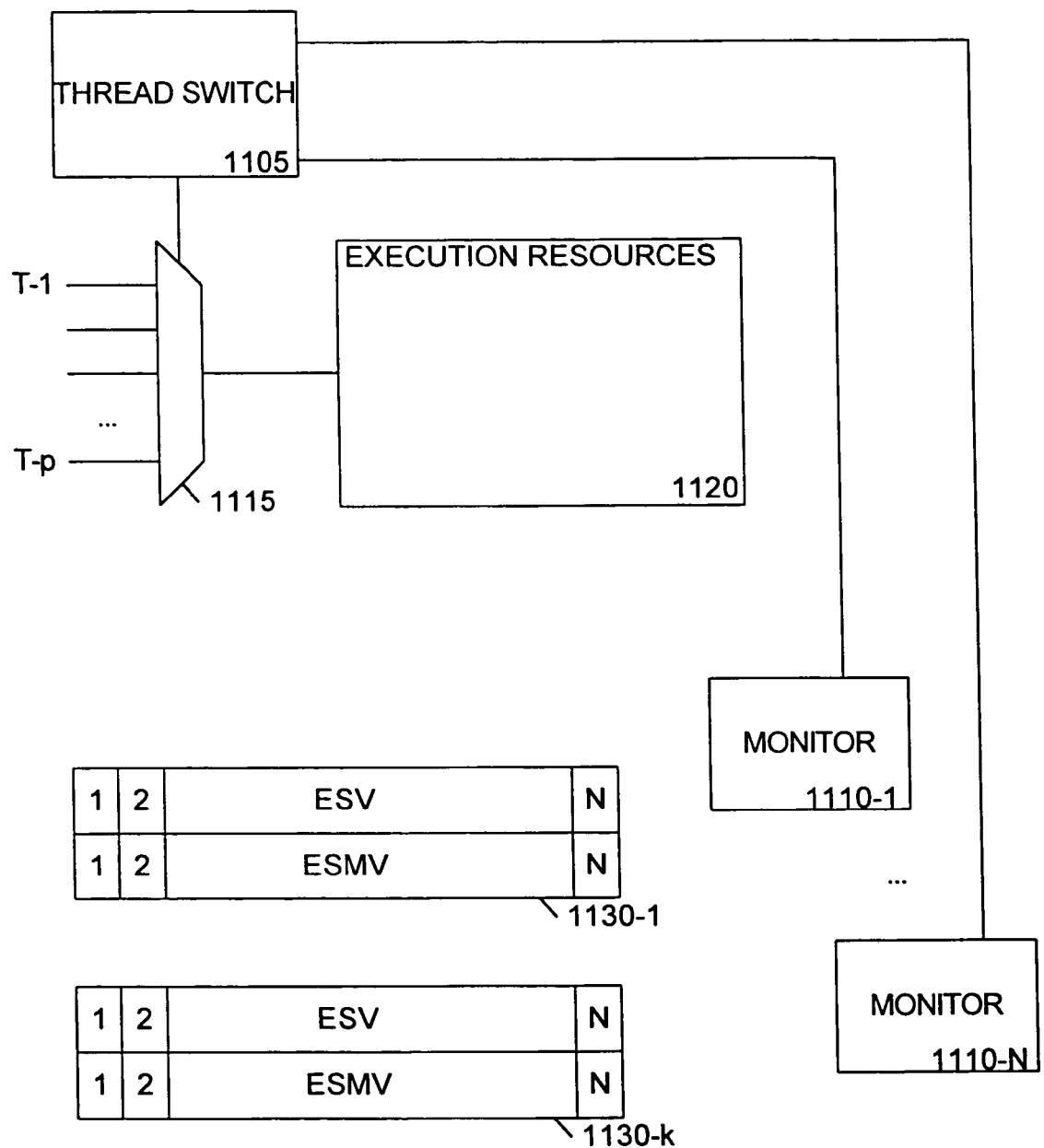
FIG. 11 illustrates one embodiment of a multithreaded processor which performs thread switching based on monitor events.

FIG. 11 illustrates one embodiment of a multithreaded processor which performs thread switching based on monitor or yield-type events. Although many embodiments have been discussed as disrupting processing flow by causing a handler to execute, other embodiments may define events that cause thread switches in a multithreaded processor. For example, in the embodiment of FIG. 11, thread switch logic is coupled to receive signals from a set of N monitors 1110-1 through 1110-N. The thread switch logic 1105 may also be coupled to one or more sets of event schema and mask pairs 1130-1 through 1130-p (p is a positive whole number). The event schema and mask pairs may allow the thread switch to combine and/or disregard certain monitor events in determining when to switch threads.

Execution resource 1120 may support execution of p threads, yet may be indifferent to whether an instruction belongs to a particular thread. The execution resource may be an execution unit, fetch logic, a decoder, or any other resource used in instruction execution. A multiplexer 1115 or other selection resource arbitrates between the various threads for access to the execution resource 1120. One of skill in the art will recognize that various resources may be shared or duplicated in a multithreaded processor and that various resources may have thread-switched access which allows a limited number of threads (e.g., one) to access the resource at a time.

If a set of conditions indicated by one or more monitors and/or one of the event schema vector and mask pairs occurs, the thread switch logic 1105 switches threads of execution. Thus, another thread may be activated instead of the thread that was active when the processor conditions matched those programmed. For example, a user program may control events that trigger thread switches.

In some multithreaded processors, each thread may have an associated set of event schema vector and mask pairs or the like. Thus, as shown in FIG. 11, the multiplexer 1115 may arbitrate between p threads, and there may be a corresponding p event schema and mask pairs. Just because a processor is multithreaded, however, does not mean that all implementations use multiple event schema vectors and masks. Some embodiments may use only one pair, or may use other enablement indicators. For example a single bit could be used as an enablement indicator to turn on or off a particular yield-type capability.

During development, a design may go through various stages, from creation to simulation to fabrication. Data representing a design may represent the design in a number of manners. First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium.

Thus, techniques for a programmable event driven yield mechanism which may activate other threads are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A multithreaded processor additionally supporting virtual multithreading, the processor comprising:
   execution logic to execute a program;
   monitor logic to be updated by the program to define a trigger condition, wherein the monitor logic comprises event storage logic to indicate if a plurality of events have occurred, the trigger condition includes a combination of the plurality of events, wherein the event storage logic includes a plurality of event counters, each of the plurality of event counters to hold a count value corresponding to a number of events of the plurality of events that have occurred, wherein the trigger condition occurs when a certain value of the count value has occurred;
   physical thread context storage to store context information for a plurality of active threads;
   virtual thread context storage to store context information for a plurality of k virtual threads; and
   a virtual thread selector coupled to the virtual thread context storage and coupled to the physical thread context storage, said virtual thread selector to select a virtual thread from a plurality of threads and swap context information for the selected virtual thread in response to the monitor logic detecting the trigger condition during the execution logic executing the program; and
   a processor thread selector to select between the selected virtual thread and another thread, wherein the processor thread selector and virtual thread selector are not the same entity.

2. The multithreaded processor of claim 1 wherein said physical thread context storage is dedicated hardware to maintain a plurality of thread contexts usable by a plurality of execution resources and wherein said multithreaded processor effectively caches virtual thread context data in one of a set consisting of a cache location, a register location, or other storage location.

3. The multithreaded processor of claim 2 wherein said multithreaded processor caches context information for the plurality of k virtual threads, wherein context information for a selected one of the plurality of k virtual threads must be switched to said physical thread context storage before active execution of said selected one of the plurality of k virtual threads.

4. The multithreaded processor of claim 2 wherein said multithreaded processor is to cache a set of context data for one of said plurality of k virtual threads in a processor storage location, wherein context information for a selected one of the plurality of k virtual threads must be switched to said physical thread context storage before active execution of said selected one of the plurality of k virtual threads.

5. The multithreaded processor of claim 1, wherein the monitor logic further comprises mask logic corresponding to the event storage logic to be updated by the program to indicate the combination of the plurality of events to occur from the event storage logic to define the trigger condition.

6. The multithreaded processor of claim 1, wherein said monitor logic is also capable of being reprogrammed by the at least one of said plurality of k virtual threads to be switched into said physical thread context storage after the at least one of said plurality of k virtual threads is switched into said physical thread context storage to define an additional trigger condition, and wherein the virtual thread selector is further to cause context information for an additional virtual thread of said plurality of k virtual threads to be switched into said physical context storage in response to the monitor logic detecting the additional trigger condition.

7. The multithreaded processor of claim 4 wherein the trigger condition includes a yield type instruction is to cause a thread switch between the plurality of k virtual threads.

8. A multithreaded processor comprising:
   monitor logic capable of being modified by a user-level program to define a yield condition, wherein the monitor logic comprises event storage logic to indicate if a plurality of events have occurred, the trigger condition includes a combination of the plurality of events, wherein the event storage logic includes a plurality of event counters, each of the plurality of event counters to hold a count value corresponding to a number of events of the plurality of events that have occurred, wherein the trigger condition occurs when a certain value of the count value has occurred;
   context storage logic to maintain a first context information for a first plurality of threads, the first plurality of threads being a plurality of active execution threads;

secondary thread logic to manage a second context information for a second plurality of threads and to change which of said second plurality of threads is a member of said first plurality of threads in response to the monitor logic detecting the yield condition, wherein the secondary thread logic comprises
   a secondary thread context store to store the second context information for the second plurality of threads,
   a secondary thread switcher coupled to the secondary thread context store, said secondary thread switcher to present a subset of the second plurality of threads as candidate active threads,
   wherein the multithreaded processor further comprises a processor thread switch logic, the processor thread switch logic being coupled to said secondary thread switcher, and
   wherein said context storage logic comprises dedicated hardware to maintain context for use by a plurality of execution resources.

9. The multithreaded processor of claim 8 wherein the yield condition includes a yield type instruction to cause a thread switch between the second plurality of threads.

10. The multithreaded processor of claim 9 further comprising a storage location to cache the second context information for said second plurality of threads, wherein the second context information for a selected one of the second plurality of threads is to be switched from the storage location to said context storage logic before active execution of said selected one of the second plurality of threads.

11. The multithreaded processor of claim 10 wherein the second context information for a subset of said second plurality of threads is switched into said context storage logic to activate the subset of said second plurality of threads.

12. A method comprising:
   executing a plurality of active threads in a plurality of thread slots in a single core of a multithreaded processor, wherein a program associated with at least one of the active threads of the plurality of active threads defines a trigger condition in hardware during executing the plurality of active threads, wherein the trigger condition includes a combination of the plurality of events;
   switching a first helper thread of a plurality of helper threads from helper thread context storage logic within the processor into a thread slot of the plurality of thread slots in response to the hardware detecting the trigger condition, wherein wherein the trigger condition occurs when a certain value of the count value has occurred in one of a plurality of event counters, each of the plurality of event counters to hold a count value corresponding to a number of events of the plurality of events that have occurred;
   executing the first helper thread concurrently with at least one active thread after switching the first helper thread into the thread slot, wherein the first helper thread defines an additional trigger condition in the hardware during executing the first helper thread; and
   switching a second helper thread of the plurality of helper threads into another thread slot of the plurality of thread slots in response to the hardware detecting the additional trigger condition.

13. The method of claim 12 wherein after switching the second helper thread into the another thread slot, the at least one of the active threads associated with the program, the first helper thread, and the second helper thread are concurrently executing as active threads in the plurality of thread slots, and wherein the trigger condition is selected from a group consisting of a combination of hardware events, a hardware latency event, a asynchronous yield-type instruction, and a synchronous execution-stopping instruction.

14. A system comprising:
   a memory to hold a user-level program, a plurality of active threads and a plurality of virtual threads;
   a multithreading processor comprising:
      hardware monitor logic to be modified during execution of the user-level program with the multithreading processor to define a trigger event, wherein the monitor logic comprises event storage logic to indicate if a plurality of events have occurred, the trigger condition includes a combination of the plurality of events, wherein the event storage logic includes a plurality of event counters, each of the plurality of event counters to hold a count value corresponding to a number of events of the plurality of events that have occurred, wherein the trigger condition occurs when a certain value of the count value has occurred;
      active hardware context storage to hold context for the plurality of active threads;
      virtual context storage to cache context for the plurality of virtual threads;
      execution resources to execute the plurality of active threads; and
      virtual threading logic to swap in a virtual thread of the plurality of virtual threads as one of the plurality of active threads in response to the hardware monitor logic detecting the trigger event.

15. The system of claim 14 wherein the active hardware context storage comprises dedicated hardware context storage and the virtual context storage comprises a cache memory within the multithreading processor.

16. The system of claim 14 wherein the hardware monitor logic comprises a low progress detector, and wherein the low progress detector is to be modified by the user-level program to define the trigger event as a low progress indicator.

17. The system of claim 14 further comprising a communication interface.

18. A processor comprising:
   N active thread slots, wherein N is an integer greater than one;
   virtual thread storage logic to hold a plurality of virtual threads;
   processor thread switch logic coupled to the N active thread slots; and
   virtual thread switch logic coupled to the processor thread switch logic and the virtual thread storage logic, said virtual thread switch logic to present a virtual thread of a plurality of virtual threads to the processor thread switch logic in response to a trigger condition associated with a first active thread in a first active thread slot of the N active thread slots, wherein the processor thread switch logic is to switch the virtual thread into any of the N active thread slots for concurrent execution of the first active thread and the virtual thread in response to being presented the virtual thread by the virtual thread switch logic, wherein the trigger condition includes a combination of the plurality of events; and
   a plurality of event counters, each of the plurality of event counters to hold a count value corresponding to a number of events of the plurality of events that have occurred, wherein the trigger condition occurs when a certain value of the count value has occurred.

19. The processor of claim 18 further comprising a user modifiable hardware monitor to be modified by a program associated with the first active thread in the first active thread slot to define the trigger condition associated with the first active thread.

20. The processor of claim 19 wherein the plurality of virtual threads include a plurality of helper threads.

21. The processor of claim 18 wherein the virtual thread switch logic is further to present a second virtual thread of the plurality of virtual threads to the processor thread switch logic in response to a second trigger condition associated with the virtual thread, wherein the processor thread switch logic is further to switch the second virtual thread into any of the N active thread slots except for the first active thread slot and a second active thread slot of the N active thread slots associated with the virtual thread in response to being presented the second virtual thread by the virtual thread switch logic.

22. A processor comprising:
first active context storage logic to hold a first context for a first thread;
second active context storage logic to hold a second context for a second thread;
monitor logic to be modified by a program associated with the first thread to define a trigger condition, wherein the monitor logic comprises event storage logic to indicate if a plurality of events have occurred, the trigger condition includes a combination of the plurality of events, wherein the event storage logic includes a plurality of event counters, each of the plurality of event counters to hold a count value corresponding to a number of events of the plurality of events that have occurred, wherein the trigger condition occurs when a certain value of the count value has occurred;
local storage to hold a third context for a third thread; and
thread switch logic coupled to the local storage, the first active context storage logic, and the second active context storage logic to swap the third context into the second active context storage logic in response to the monitor logic detecting the trigger condition.

23. The processor of claim 22 wherein the third thread includes a helper thread.

24. The processor of claim 22 wherein the trigger condition is selected from a group consisting of a long latency event, an instruction, a threshold of event occurrences, and a combination of events.

25. The processor of claim 22 wherein the local storage includes a storage device selected from a group consisting of a cache memory, a register, and another processor storage area.

26. The processor of claim 22, wherein the program includes a user-level application program.

27. The multithread processor of claim 1, wherein the virtual thread selector includes microcode.

* * * * *